(12) United States Patent
Kenyon et al.

(10) Patent No.: US 11,636,206 B2
(45) Date of Patent: *Apr. 25, 2023

(54) DEFERRED MALWARE SCANNING

(71) Applicant: Sophos Limited, Abingdon (GB)

(72) Inventors: Timothy Bruce Kenyon, Oxford (GB); Patrick James Hammack, Blaine, WA (US)

(73) Assignee: Sophos Limited, Abingdon (GB)

( * ) Notice: Subject to any disclaimer, the term of this patent is extended or adjusted under 35 U.S.C. 154(b) by 103 days.

This patent is subject to a terminal disclaimer.

(21) Appl. No.: 17/213,886

(22) Filed: Mar. 26, 2021

(65) Prior Publication Data

US 2021/0216634 A1 Jul. 15, 2021

Related U.S. Application Data

(63) Continuation of application No. 16/896,563, filed on Jun. 9, 2020, now Pat. No. 10,997,294, which is a continuation of application No. PCT/US2019/061074, filed on Nov. 13, 2019.

(60) Provisional application No. 62/769,256, filed on Nov. 19, 2018.

(51) Int. Cl.
*G06F 21/56* (2013.01)
*G06F 21/52* (2013.01)
*G06F 21/55* (2013.01)

(52) U.S. Cl.
CPC .......... *G06F 21/566* (2013.01); *G06F 21/52* (2013.01); *G06F 21/554* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 6,757,830 | B1 | 6/2004 | Tarbottom et al. |
| 8,181,244 | B2 | 5/2012 | Boney |
| 8,201,243 | B2 | 6/2012 | Boney |
| 8,418,250 | B2 | 4/2013 | Morris et al. |
| 8,719,932 | B2 | 5/2014 | Boney |
| 8,726,389 | B2 | 5/2014 | Morris et al. |
| 8,763,123 | B2 | 6/2014 | Morris et al. |
| 8,856,505 | B2 | 10/2014 | Schneider |
| 9,413,721 | B2 | 8/2016 | Morris et al. |
| 9,479,357 | B1 | 10/2016 | Fu et al. |

(Continued)

OTHER PUBLICATIONS

UKIPO, "Application Serial No. GB2103651.2 First Examination Report dated Mar. 29, 2021", 1 page.

(Continued)

*Primary Examiner* — Benjamin E Lanier
(74) *Attorney, Agent, or Firm* — Strategic Patents, P.C.

(57) ABSTRACT

A code segment executing on a compute instance may be identified as suspicious based on runtime behavior or similar behavioral analysis or the like. In order to ensure the identification and use of the most up-to-date identification and remediation tools, the compute instance may defer various remediation steps for an interval, during which the compute instance may wait for data updates from a threat management system. After the interval has passed, the compute instance may use any updated data or tools in order to address the code segment that triggered the initial malware detection.

20 Claims, 15 Drawing Sheets

(56) References Cited

U.S. PATENT DOCUMENTS

| | | |
|---|---|---|
| 9,578,045 B2 | 2/2017 | Jaroch et al. |
| 10,257,224 B2 | 4/2019 | Jaroch et al. |
| 10,284,591 B2 | 5/2019 | Giuliani et al. |
| 10,997,294 B2 * | 5/2021 | Kenyon .................. G06F 21/52 |
| 2006/0168660 A1 | 7/2006 | Edwards et al. |
| 2011/0023118 A1 | 1/2011 | Wright et al. |
| 2012/0278892 A1 | 11/2012 | Turbin |
| 2015/0227742 A1 | 8/2015 | Pereira |
| 2016/0359695 A1 * | 12/2016 | Yadav ..................... H04L 43/04 |
| 2020/0302058 A1 | 9/2020 | Kenyon et al. |

OTHER PUBLICATIONS

WIPO, "PCT Application No. PCT/US19/61074 International Preliminary Report on Patentability dated Jun. 3, 2021", 7 pages.
USPTO, "U.S. Appl. No. 16/896,563 Non-Final Office Action dated Sep. 8, 2020", 22 pages.
USPTO, "U.S. Appl. No. 16/896,563 Notice of Allowance dated Dec. 21, 2020", 9 pages.
ISA, "PCT Appln Serial No. PCT/US19/61074 International Search Report and Written Opinion dated Feb. 12, 2020", 10 pages.

* cited by examiner

DEFERRED MALWARE SCANNING

RELATED APPLICATIONS

This application is a continuation of U.S. patent application Ser. No. 16/896,563, filed Jun. 9, 2020, which is a continuation of International Application No. PCT/US2019/61074, filed Nov. 13, 2019, which claims priority to U.S. Provisional Patent Application No. 62/769,256, filed on Nov. 19, 2018, with the entire contents of each of these applications hereby incorporated herein by reference.

FIELD

The present disclosure relates to a threat management system, and more particularly, to threat management systems and techniques featuring deferred malware scanning.

BACKGROUND

Certain anti-malware techniques are capable of detecting new, previously unseen malware, or potential malware, before any corresponding signatures or remediation strategies are available. There remains a need for improved remediation tools to address these new malware threats.

SUMMARY

A code segment executing on a compute instance may be identified as suspicious based on runtime behavior or similar behavioral analysis or the like. In order to ensure the identification and use of the most up-to-date identification and remediation tools, the compute instance may defer various remediation steps for an interval, during which the compute instance may wait for data updates from a threat management system. After the interval has passed, the compute instance may use any updated data or tools in order to address the code segment that triggered the initial malware detection.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

Figure 1:
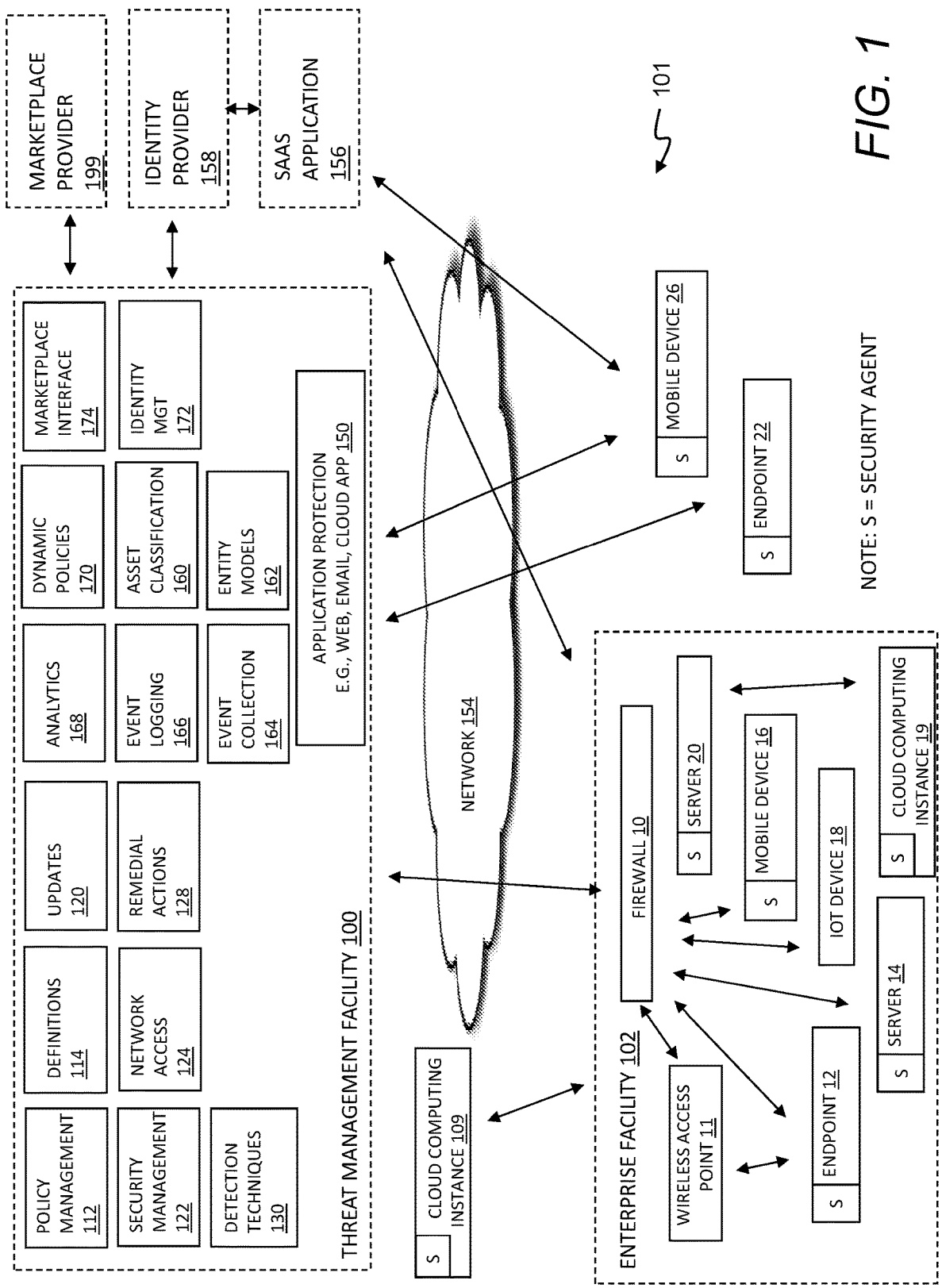
FIG. 1 depicts a block diagram of a threat management system.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include the entity model facility 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

Figure 2:
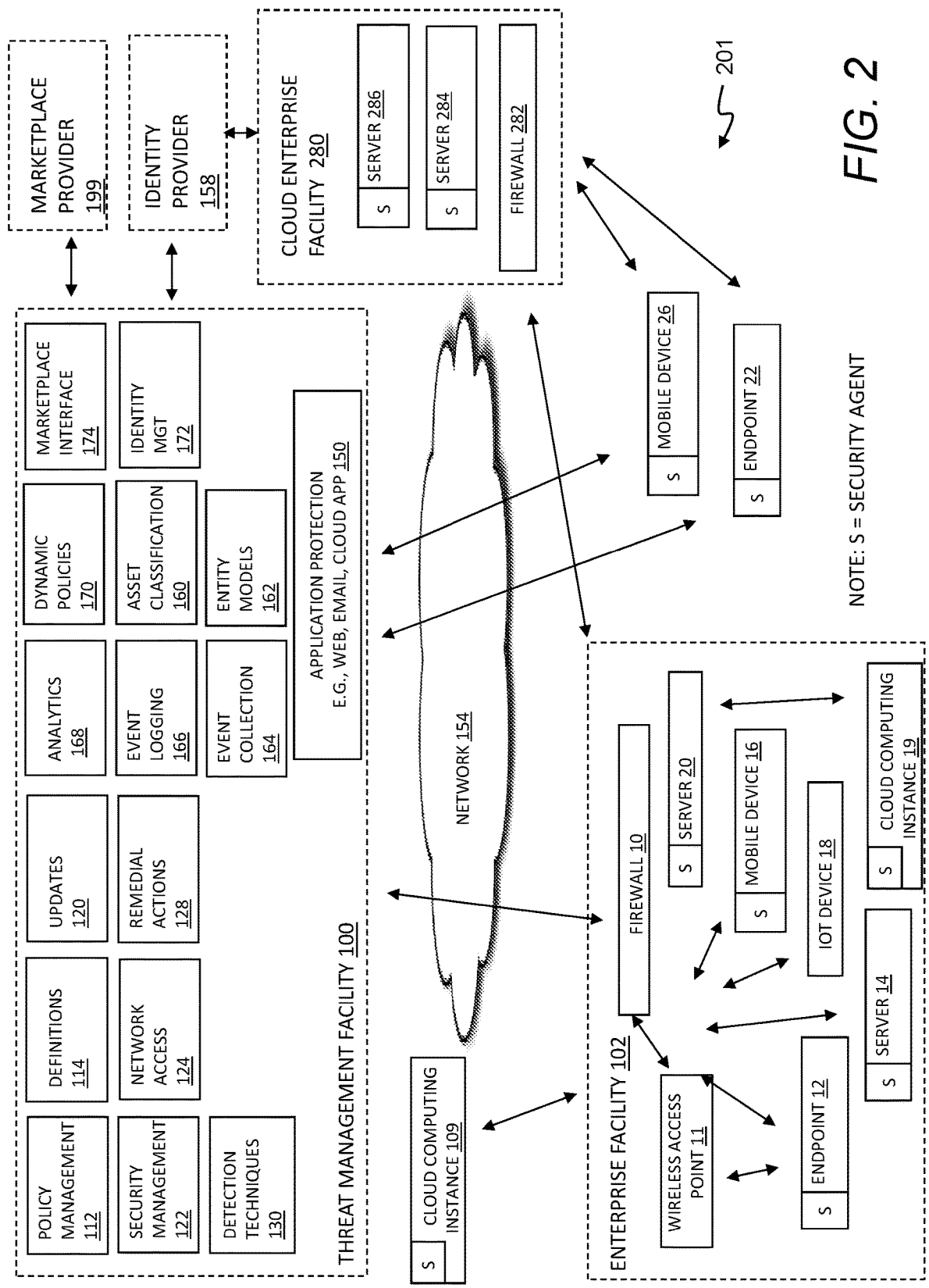
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
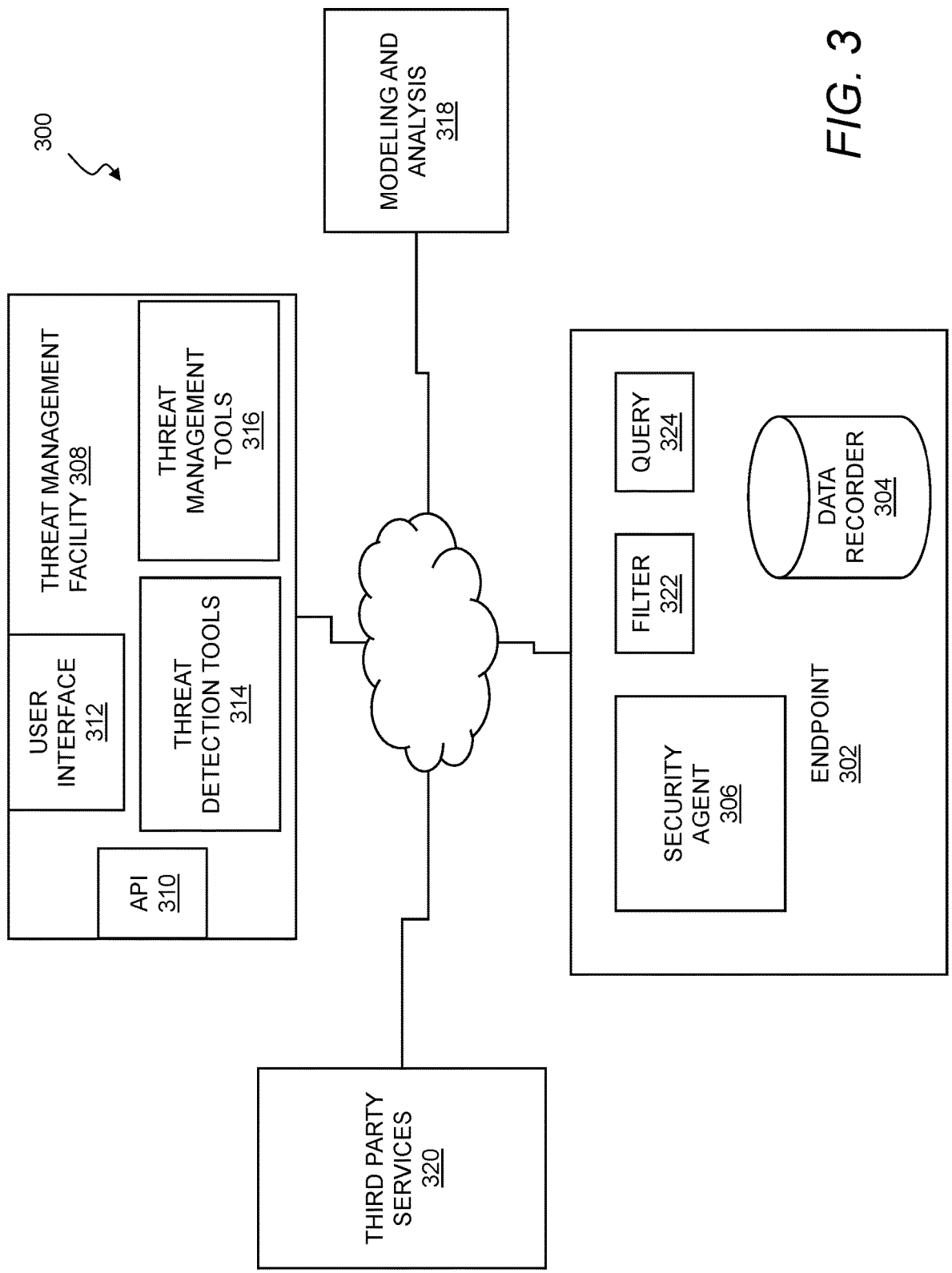
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third-party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature-based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
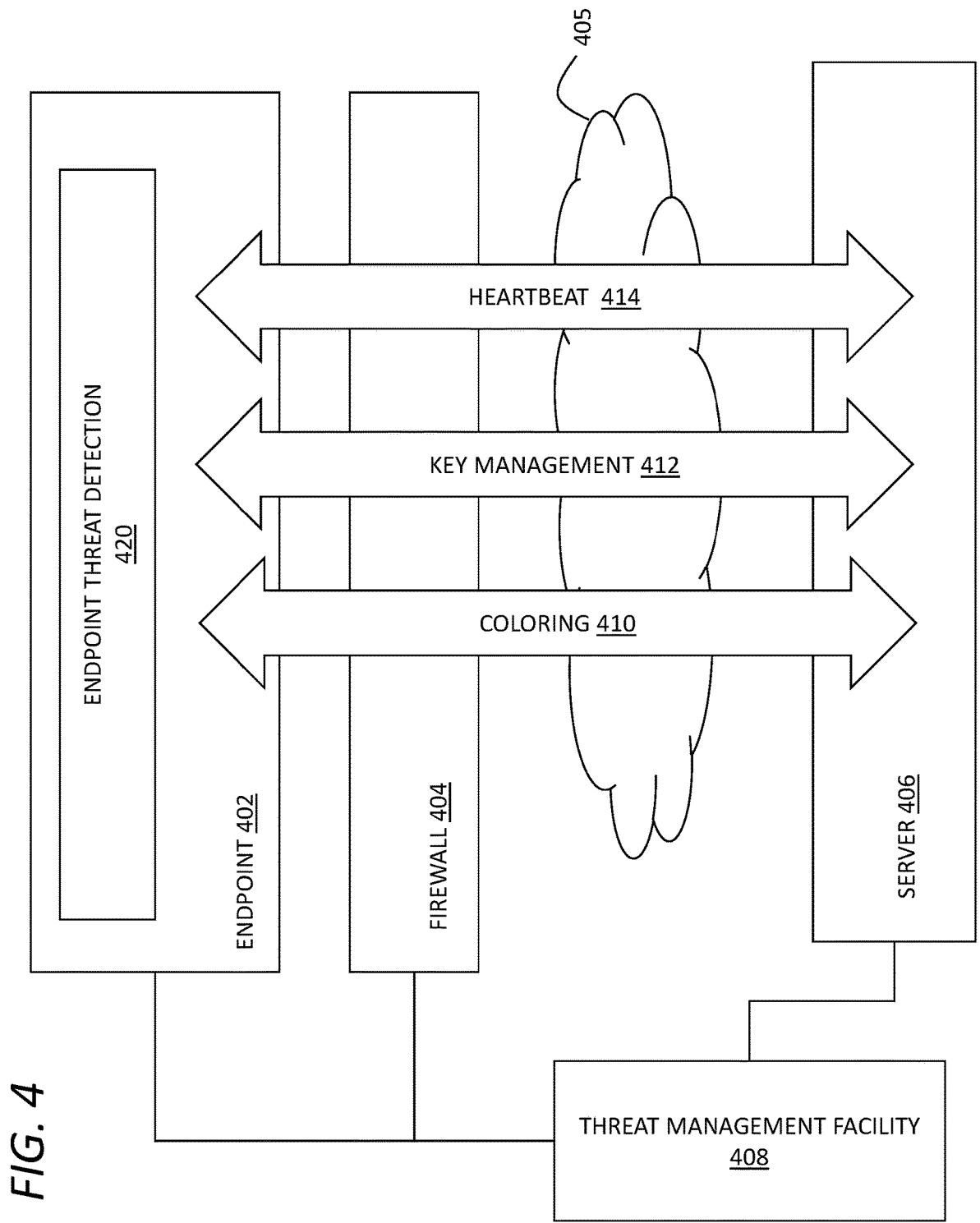
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 402 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 5:
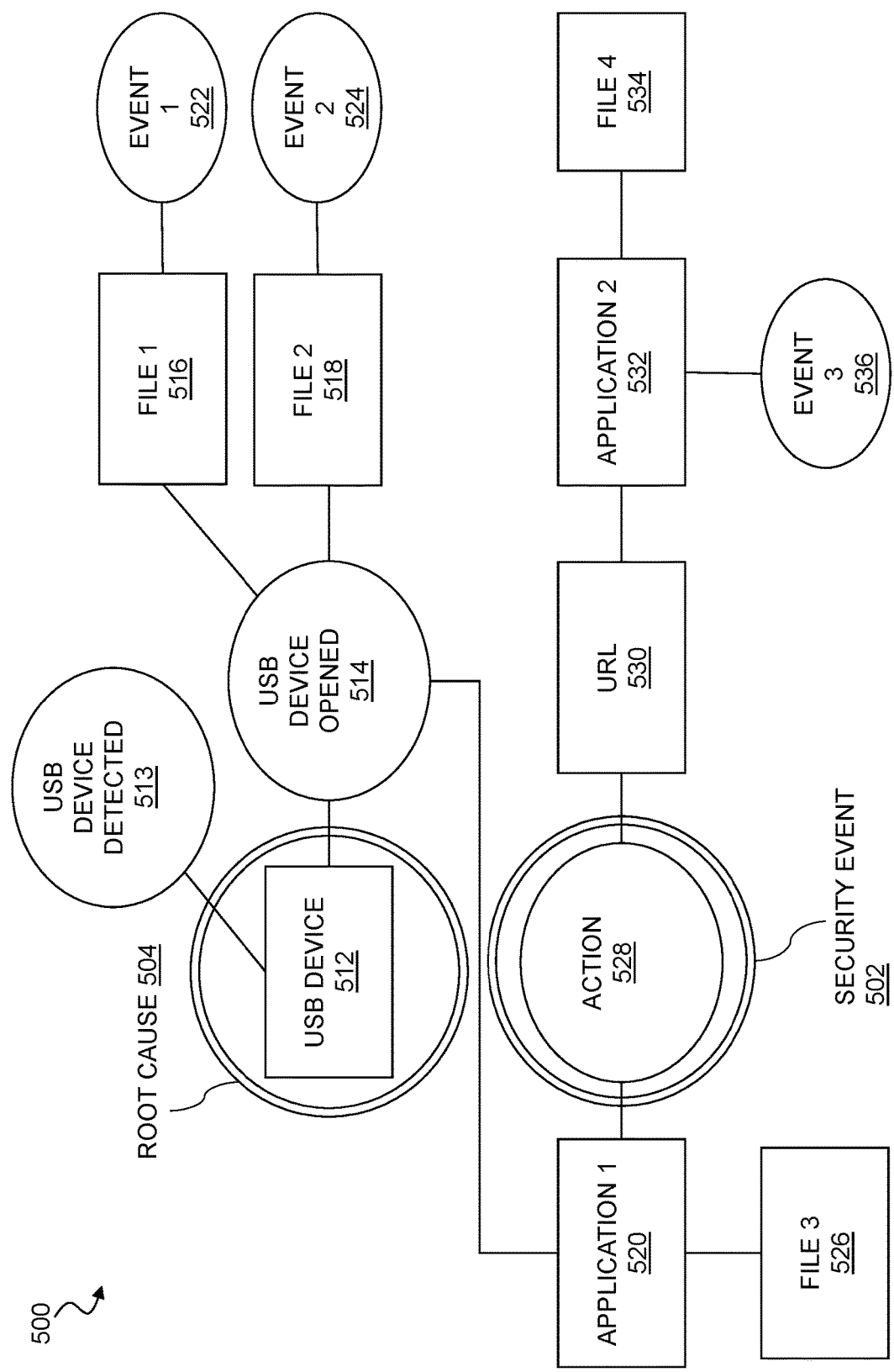
FIG. 5 illustrates an event graph stored by a data recorder.

FIG. 5 illustrates an event graph 500 stored by a data recorder such as any of the data recorders described herein.

The event graph 500 may include a sequence of computing objects causally related by a number of events, and which provide a description of computing activity on one or more endpoints. The event graph 500 may be generated, for example, when a security event 502 is detected on an endpoint, and may be based on a data log or similar records obtained by an event data recorder during operation of the endpoint. The event graph 500 may be used to determine a root cause 504 of the security event 502 as generally described above. The event graph 500 may also or instead be continuously generated to serve as, or be a part of, the data log obtained by the data recorder. In any case, an event graph 500, or a portion of an event graph 500 in a window before or around the time of a security event, may be obtained and analyzed after a security event 502 occurs to assist in determining the root cause 504 of the security event 502. The event graph 500 depicted in the figure is provided by way of example only, and it will be understood that many other forms and contents for event graphs 500 are also or instead possible. It also will be understood that while the figure illustrates a graphical depiction of an event graph 500, the event graph 500 may be stored in any suitable data structure or combination of data structures suitable for capturing the chain of events and objects in a manner that preserves causal relationships for use in forensics and malware detection as contemplated herein.

By way of example, the event graph 500 depicted in the figure begins with a computing object that is a USB device 512, which may be connected to an endpoint. Where the USB device 512 includes a directory or file system, the USB device 512 may be mounted or accessed by a file system on an endpoint to read contents. The USB device 512 may be detected 513 and contents of the USB device 512 may be opened 514, e.g., by a user of the endpoint or automatically by the endpoint in response to detection of the USB device 512. The USB device 512 may include one or more files and applications, e.g., a first file 516, a second file 518, and a first application 520. The first file 516 may be associated with a first event 522 and the second file may be associated with a second event 524. The first application 520 may access one or more files on the endpoint, e.g., the third file 526 shown in the figure. The first application 520 may also or instead perform one or more actions 528, such as accessing a URL 530. Accessing the URL 530 may download or run a second application 532 on the endpoint, which in turn accesses one or more files (e.g., the fourth file 534 shown in the figure) or is associated with other events (e.g., the third event 536 shown in the figure).

In the example provided by the event graph 500 depicted in the figure, the detected security event 502 may include the action 528 associated with the first application 520, e.g., accessing the URL 530. By way of example, the URL 530 may be a known malicious URL or a URL or network address otherwise associated with malware. The URL 530 may also or instead include a blacklisted network address that although not associated with malware may be prohibited by a security policy of the endpoint or enterprise network in which the endpoint is a participant. The URL 530 may have a determined reputation or an unknown reputation. Thus, accessing the URL 530 can be detected through known computing security techniques.

In response to detecting the security event 502, the event graph 500 may be traversed in a reverse order from a computing object associated with the security event 502 based on the sequence of events included in the event graph 500. For example, traversing backward from the action 528 leads to at least the first application 520 and the USB device 512. As part of a root cause analysis, one or more cause identification rules may be applied to one or more of the preceding computing objects having a causal relationship with the detected security event 502, or to each computing object having a causal relationship to another computing object in the sequence of events preceding the detected security event 502. For example, other computing objects and events may be tangentially associated with causally related computing objects when traversing the event graph 500 in a reverse order—such as the first file 516, the second file 518, the third file 525, the first event 522, and the second event 524 depicted in the figure. In an aspect, the one or more cause identification rules are applied to computing objects preceding the detected security event 502 until a cause of the security event 502 is identified.

In the example shown in the figure, the USB device 512 may be identified as the root cause 504 of the security event 502. In other words, the USB device 512 was the source of the application (the first application 520) that initiated the security event 502 (the action 528 of accessing the potentially malicious or an instance of the URL 530 that is otherwise unwanted).

The event graph 500 may similarly be traversed going forward from one or more of the root cause 504 or the security event 502 to identify one or more other computing objects affected by the root cause 504 or the security event 502. For example, the first file 516 and the second file 518 potentially may be corrupted because the USB device 512 included malicious content. Similarly, any related actions performed after the security event 502 such as any performed by the second application 532 may be corrupted. Further testing or remediation techniques may be applied to any of the computing objects affected by the root cause 504 or the security event 502.

The event graph 500 may include one or more computing objects or events that are not located on a path between the security event 502 and the root cause 504. These computing objects or events may be filtered or 'pruned' from the event graph 500 when performing a root cause analysis or an analysis to identify other computing objects affected by the root cause 504 or the security event 502. For example, computing objects or events that may be pruned from the event graph 500 may include the USB drive 510 and the USB device being detected 513.

It will be appreciated that the event graph 500 depicted in FIG. 5 is an abstracted, simplified version of actual nodes and events on an endpoint for demonstration. Numerous other nodes and edges will be present in a working computing environment. For example, when a USB device is coupled to an endpoint, the new hardware will first be detected, and then the endpoint may search for suitable drivers and, where appropriate, present a user inquiry of how the new hardware should be handled. A user may then apply a file system to view contents of the USB device and select a file to open or execute as desired, or an autorun.exe or similar file may be present on the USB device that begins to execute automatically when the USB device is inserted. All of these operations may require multiple operating system calls, file system accesses, hardware abstraction layer interaction, and so forth, all of which may be discretely represented within the event graph 500, or abstracted up to a single event or object as appropriate. Thus, it will be appreciated that the event graph 500 depicted in the drawing is intended to serve as an illustrative example only, and not to express or imply a particular level of abstraction that is necessary or useful for root cause identification as contemplated herein.

The event graph 500 may be created or analyzed using rules that define one or more relationships between events and computing objects. The C Language Integrated Production System (CLIPS) is a public domain software tool intended for building expert systems, and may be suitably adapted for analysis of a graph such as the event graph 500 to identify patterns and otherwise apply rules for analysis thereof. While other tools and programming environments may also or instead be employed, CLIPS can support a forward and reverse chaining inference engine suitable for a large amount of input data with a relatively small set of inference rules. Using CLIPS, a feed of new data can trigger a new inference, which may be suitable for dynamic solutions to root cause investigations.

An event graph such as the event graph 500 shown in the figure may include any number of nodes and edges, where computing objects are represented by nodes and events are represented by edges that mark the causal or otherwise directional relationships between computing objects such as data flows, control flows, network flows and so forth. While processes or files are common forms of nodes that might appear in such a graph, any other computing object such as an IP address, a registry key, a domain name, a uniform resource locator, a command line input or other object may also or instead be designated to be a node in an event graph as contemplated herein. Similarly, while an edge may be formed by an IP connection, a file read, a file write, a process invocation (parent, child, etc.), a process path, a thread injection, a registry write, a domain name service query, a uniform resource locator access and so forth other edges may be designated. As described above, when a security event is detected, the source of the security event may serve as a starting point within the event graph 500, which may then be traversed backward to identify a root cause using any number of suitable cause identification rules. The event graph 500 may then usefully be traversed forward from that root cause to identify other computing objects that are potentially tainted by the root cause so that a more complete remediation can be performed.

Figure 6:
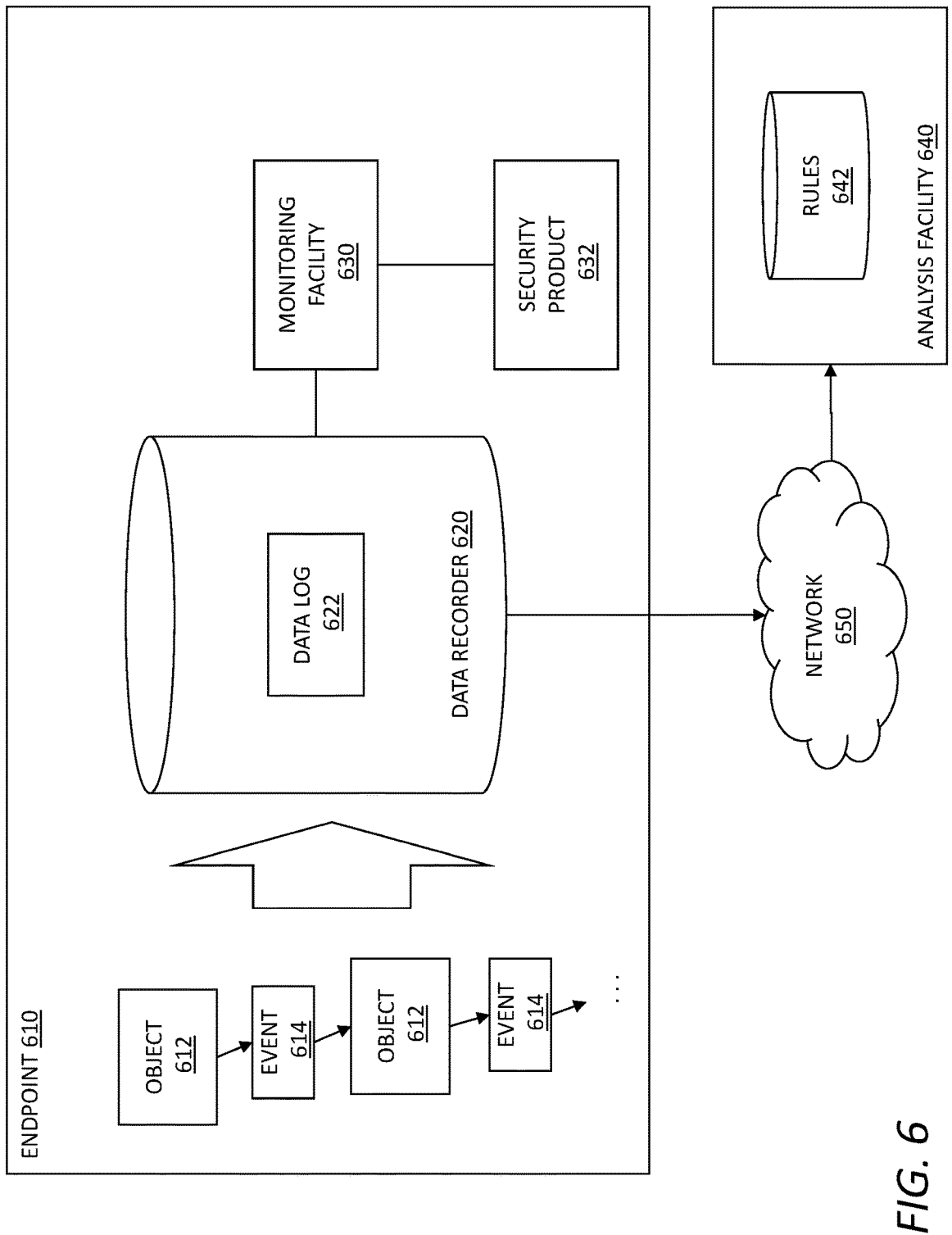
FIG. 6 shows an endpoint recording events with a data recorder.

FIG. 6 shows an endpoint recording events with a data recorder. The system 600 may include an endpoint 610 containing a data recorder 620, a monitoring facility 630, and any number of objects 612 and events 614. An analysis facility 640 may be coupled in a communicating relationship with the endpoint 610 over a data network 650 such as any of the networks described above. It will be appreciated that, while illustrated as components of the endpoint 610, certain components of the system 600 such as the data recorder 620 and the monitoring facility 630 and the analysis facility may also or instead be realized as remote services instantiated on a virtual appliance, a public or private cloud, or the like, any of which may be coupled to the endpoint 610 through the data network 650 or another communication channel (not shown). Each of the components of the system 600 may be configured with suitable programming and configuration to participate in the various forensic techniques, threat detection techniques, and security management techniques contemplated herein.

The endpoint 610 may be any of the endpoints described herein, e.g., a computing device in an enterprise network, or any other device or network asset that might join or participate in an enterprise or otherwise operate on an enterprise network. This may, for example, include a server, a client device such as a desktop computer or a mobile computing device (e.g., a laptop computer or a tablet), a cellular phone, a smart phone, or other computing device suitable for participating in the system 600 or in an enterprise.

In general, the endpoint 610 may include any number of computing objects 612, which may for example, be processes executed by one or more processors or other processing circuitry, files or data stored in memory, or any other computing objects described herein. While the term object has a number of specific meanings in the art, and in particular in object-oriented programming, it will be understood that the term 'object' as used herein is intended to be significantly broader, and may include any data, process, file or combination of these including without limitation any process, application, executable, script, dynamic linked library (DLL), file, data, database, data source, data structure, function, resource locator (e.g., uniform resource locator (URL) or other uniform resource identifier (URI)), or the like that might be resident on the endpoint 610 and manipulated by the endpoint 610 or another component of the system 600 or other systems described elsewhere herein. The object 612 may also or instead include a remote resource, such as a resource identified in a URL. That is, while the object 612 in the figure is depicted as residing on the endpoint 610, an object 612 may also reside elsewhere in the system 600, and may be specified for example with a link, pointer, or reference that is locally stored on the endpoint 610.

The object 612 may be an item that is performing an action or causing an event 614, or the object 612 may be an item that is receiving the action or is the result of an event 614 (e.g., the object 612 may be an item in the system 600 being acted upon by an event 614 or another object 612). In general, an event 614 as contemplated herein may be any data flow, execution flow, control flow, network flow, or other similar action or event that might causally relate objects 612 to one another. Where the object 612 is data or includes data, the object 612 may be encrypted or otherwise protected, or the object 612 may be unencrypted or otherwise unprotected. The object 612 may be a process or other computing object that performs an action, which may include a single event 614 or a collection or sequence of events 614 taken by a process. The object 612 may also or instead include an item such as a file or lines of code that are executable to perform such actions. The object 612 may also or instead include a computing component upon which an action is taken, e.g., a system setting (e.g., a registry key or the like), a data file, a URL, and so forth. The object 612 may exhibit a behavior such as an interaction with another object or a component of the system 600.

Objects 612 may be described in terms of persistence. The object 612 may, for example, be a part of a process, and remain persistent as long as that process is alive. The object 612 may instead be persistent across an endpoint 610 and remain persistent as long as an endpoint 610 is active or alive. The object 612 may instead be a global object having persistence outside of an endpoint 610, such as a URL or a data store. In other words, the object 612 may be a persistent object with persistence outside of the endpoint 610.

Although many if not most objects 612 will typically be benign objects forming a normal part of the computing environment for an operating endpoint 610, an object 612 may contain software associated with an advanced persistent threat (APT) or other malware that resides partially or entirely on the endpoint 610. This associated software may have reached the endpoint 610 in a variety of ways, and may have been placed manually or automatically on the endpoint 610 by a malicious source. It will be understood that the associated software may take any number of forms and have any number of components. For example, the associated software may include an executable file that can execute independently, or the associated software may be a macro, plug-in, or the like that executes within another application. Similarly, the associated software may manifest as one or more processes or threads executing on the endpoint 610. Further, the associated software may install from a file on the endpoint 610 (or a file remote from the endpoint 610), and the associated software may create one or more files such as data files or the like while executing. Associated software should be understood to generally include all such files and processes except where a specific file or process is more specifically noted.

An event 614 may include an action, a behavior, an interaction, and so forth. The event 614 may be generated by or otherwise related to an object 612. For example, the event 614 may be associated with a file and include an action such as a read, a write, an open, a move, a copy, a delete, and so forth. The event 614 may also or instead include an inter-process communication, e.g., a create, a handle, a debug, a remote injection, and so forth. The event 614 may also or instead include a network action such as accessing an Internet Protocol (IP) address or URL. It will also be understood that the event 614 may be, e.g., a kernel-level event, a software-level event, a hardware-level or device driver event, a communications event, a file system event and so forth. In another aspect, the event 614 may be a synthetic event that is based on a combination of other discrete events, or based on a score, metric (e.g., reputation) or other calculated or derived quantity or evaluation, as well as any combination of the foregoing. Thus, while events are illustrated as isolated discrete items in FIG. 6, events may be compound items, calculated items, analytical results, and so forth. In one aspect, created synthetic or derivative events that are formed of combinations of other events or calculated metrics and the like may usefully compress the amount of storage required for the data recorder 620, and or the amount of network communications required to report potentially relevant events to a remote resource such as the analysis facility 640.

The data recorder 620 may monitor and record activity related to the objects 612 and events 614 occurring on the endpoint 610. The activity of the endpoint 610 may be stored in a data log 622 or the like on the data recorder 620, which may be stored locally on the endpoint 610 (as depicted) or remotely at a threat management resource, or some combination of these, such as where the data log 622 is periodically transmitted to a remote facility for archiving or analysis. The data recorder 620 may continuously record any activity occurring on the endpoint 610 for predetermined periods of time before overwriting previously recorded data. Thus, the data log 622 may include a continuous data feed of events 614. When an event 614 is detected that is a beacon or trigger event (such as a file detection, a malicious traffic detection, or the like), the data log 622 may be saved and transmitted to an analysis facility 640 or the like for analysis, e.g., to determine a root cause of the beacon or trigger event. The data log 622 may be used to create an event graph or other snapshot of the activity on the endpoint 610, e.g., for a period of time surrounding a beacon or trigger event. The beacon or trigger event may be detected locally by the monitoring facility 630, or remotely by a remote threat management facility or the like, or some combination of these.

While illustrated on the endpoint 610, it will be understood that the data recorder 620 may also or instead be implemented at a remote location such as a threat management facility or other enterprise network security resource, or some combination of these. The data recorder 620 may be provisioned on the same or a different device than a data store in which data is stored. The data recorder 620 may be configured to record data as efficiently as possible so as to minimize impact on the endpoint 610. It will further be appreciated that, while a single data recorder is depicted, the endpoint 610 may include any number of data recorders, which may operate independently or in a coordinated manner, e.g., to distribute logging functions or prioritize monitoring of highly sensitive hardware or software. Furthermore, multiple endpoints may contain data records that report asynchronously or in a coordinated manner to the analysis facility 640.

The monitoring facility 630 may work in conjunction with the data recorder 620 to instrument the endpoint 610 so that any observable events 614 by or involving various objects 612 can be monitored and recorded. It will be appreciated that various filtering rules and techniques may be used to synopsize, summarize, filter, compress or otherwise process information captured by the data recorder 620 to help ensure that relevant information is captured while maintaining practical limits on the amount of information that is gathered.

A security product 632 may execute on the endpoint 610 to detect a security event on the endpoint 610, which may act as the beacon or trigger event for the system 600. The security product 632 may use techniques such as signature-based and behavioral-based malware detection including without limitation one or more of host intrusion prevention, malicious traffic detection, URL blocking, file-based detection, and so forth.

The beacon or trigger event on the endpoint 610 may be a fully qualified (e.g., definitive) detection of a compromise or other malicious activity. In another aspect, the beacon or trigger event on the endpoint 610 may be a suspicious behavior that is suspicious but not confirmed as malicious. For example, the beacon or trigger event on the endpoint 610 may signal an unusual behavior that is known to commonly appear concurrently with the detection of malware. In an aspect, when the beacon or trigger event is a suspicious behavior, the data log 622 may be analyzed differently than when the beacon or trigger event is a confirmed malicious behavior. For example, the data log 622 may be sent to a different component of the system 600 through the network, e.g., to a different analysis facility 640.

The monitoring facility 630 may be disposed remotely from the endpoint 610 or analysis facility 640. The monitoring facility 630 may be included on one or more of the endpoint 610 or analysis facility 640. In an aspect, the monitoring facility 630 and the analysis facility 640 included in the same component.

The analysis facility 640 may analyze the data log 622, e.g., as part of a root cause analysis and to identify objects 612 compromised by the root cause. To this end, the analysis facility 640 may utilize one or more rules 642 for applying to the data included in the data log 622 to determine a root cause of a beacon or trigger event such as a suspected or actual security compromise on the endpoint 610. The analysis facility 640 may reside locally on the endpoint 610 (e.g., be a part of, embedded within, or locally coupled to the endpoint 610). The analysis facility 640 may be an external facility, or it may reside in a virtual appliance (e.g., which could be run by a protected set of systems on their own network systems), a private cloud, a public cloud, and so forth. The analysis facility 640 may store locally-derived threat information for use in subsequent identification, remediation, or other similar activity. The analysis facility 640 may also or instead receive threat information from a third-party source such as any public, private, educational, or other organization that gathers information on network threats and provides analysis and threat detection information for use by others. This third-party information may, for example, be used to improve detection rules or other forensic analysis that might be performed on information in the data log 622.

The analysis facility 640 may create an event graph. In general, the event graph may represent information in the data log 622 in a graph where objects 612 are nodes and events 614 are edges connecting the nodes to one another based on causal or other relationships as generally contemplated herein. The event graph may be used by the analysis facility 640 or other component(s) of the system 600 as part of a root cause analysis and to identify objects 612 compromised by the root cause. The event graph may also or instead be displayed to a user of the system 600 or endpoint 610, e.g., using an interactive user interface or the like. In one aspect, the analysis facility 640 may be incorporated into a threat management facility for an enterprise network. In another aspect, the analysis facility 640 may operate independently from the threat management facility and may be, for example, a third party, remote service or the like.

The system 600 may advantageously use the data log 622 to configure and initialize an analysis in a sandboxed or otherwise isolated environment where the execution of the recorded activity related to a detected security event is allowed to run. That is, rather than uploading a complete image of an endpoint 610 using conventional techniques, the data log 622 may include only a series of events/processes related to the detected event that may be uploaded for execution/analysis. The analysis may thus include executing this series of events/processes in the same order to determine a threat level for the endpoint 610.

The data log 622 may include data from a single endpoint 610, or from a number of endpoints 610, for example where one endpoint 610 accesses a service or a file on another endpoint. This advantageously facilitates tracking or detection of potentially malicious activity that spans multiple devices, particularly where the behavior on a single endpoint does not appear malicious. Thus, the monitoring facility 630 may monitor activity from an endpoint 610 exclusively, or use the full context of activity from all protected endpoints 610, or some combination of these. Similarly, the event graph generated from the data log 622 may include activity from one endpoint 610 exclusively, or use the full context of activity from all protected endpoints 610, or some combination of these. Data logs 622 and event graphs may also or instead be stored for future analyses, e.g., for comparing to future data logs and event graphs.

Similarly, the events may include human interactions such as keyboard strokes, mouse clicks or other input and output to human interface devices and hardware. This usefully permits discrimination within causal chains among events initiated by processes executing on a device and events that are initiated or controlled by a human user that is present on the endpoint.

In one aspect, the data recorder 620 may monitor events from a low-level driver, referred to herein as an endpoint defense driver, installed in the kernel space early in an operating system installation or boot process, e.g., prior to population of the user space with user applications and the like. In this manner, the endpoint defense driver may be configured to instrument operation of the endpoint so that file operations and interprocess communications are passed through the kernel where the endpoint defense driver can enforce restrictions on file modifications, code injections and so forth, and provide visibility over such interprocess communications for purposes of recording event data as contemplated herein. Certain related techniques are described, for example, in U.S. patent application Ser. No. 15/795,952, filed on Oct. 27, 2017, the entire contents of which are hereby incorporated by reference. As described therein, in order to secure interprocess communications and ensure that protected computing objects are not modified, each process can be configured to communicate with other processes using a system call that passes through the kernel space, and in particular the endpoint defense driver, in order to ensure that the endpoint defense driver has an opportunity to regulate process activity in a manner consistent with a list of protected objects maintained in a protection cache maintained in the kernel.

The endpoint defense driver may maintain a number of caches to assist in monitoring the endpoint, such as a process cache, a protection cache (also referred to as a protected object cache or tamper protection cache), and a file cache. In general, the process cache may store information related to a process such as the application name, application family (e.g., a vendor or commonly used name for a suite of software including installers, libraries, supporting applications or processes, and so forth), an application path, and an application category (such as any of the categories or types described herein). The protection cache may support tamper protection tools. In particular, the endpoint defense driver may initially load a list of protected objects such as registry keys, services, applications, directories, and so forth. The endpoint defense driver may proactively prevent any changes to these protected objects (which include the protection cache itself), or may prevent any changes except by other protected objects identified in the protection cache. The file cache may contain information about files on the endpoint, and may store any useful information including information about protection status, modifications, local or global reputation, and so forth. The endpoint defense driver can use these caches in a variety of ways to support secure operation of an endpoint protection system. For example, as noted above, by directing interprocess communications and file system operations through the endpoint defense driver, security and tamper prevention can be ensured on an object-by-object basis, e.g., for registry keys, files, processes, directories, and so forth. The endpoint defense driver can also set and retrieve information about new processes as they are launched in the user space. A data recorder may usefully record transactions detected by, or managed by or through, the endpoint defense driver, which may advantageously provide secure, kernel-level monitoring of processes executing on an endpoint.

Figure 7:
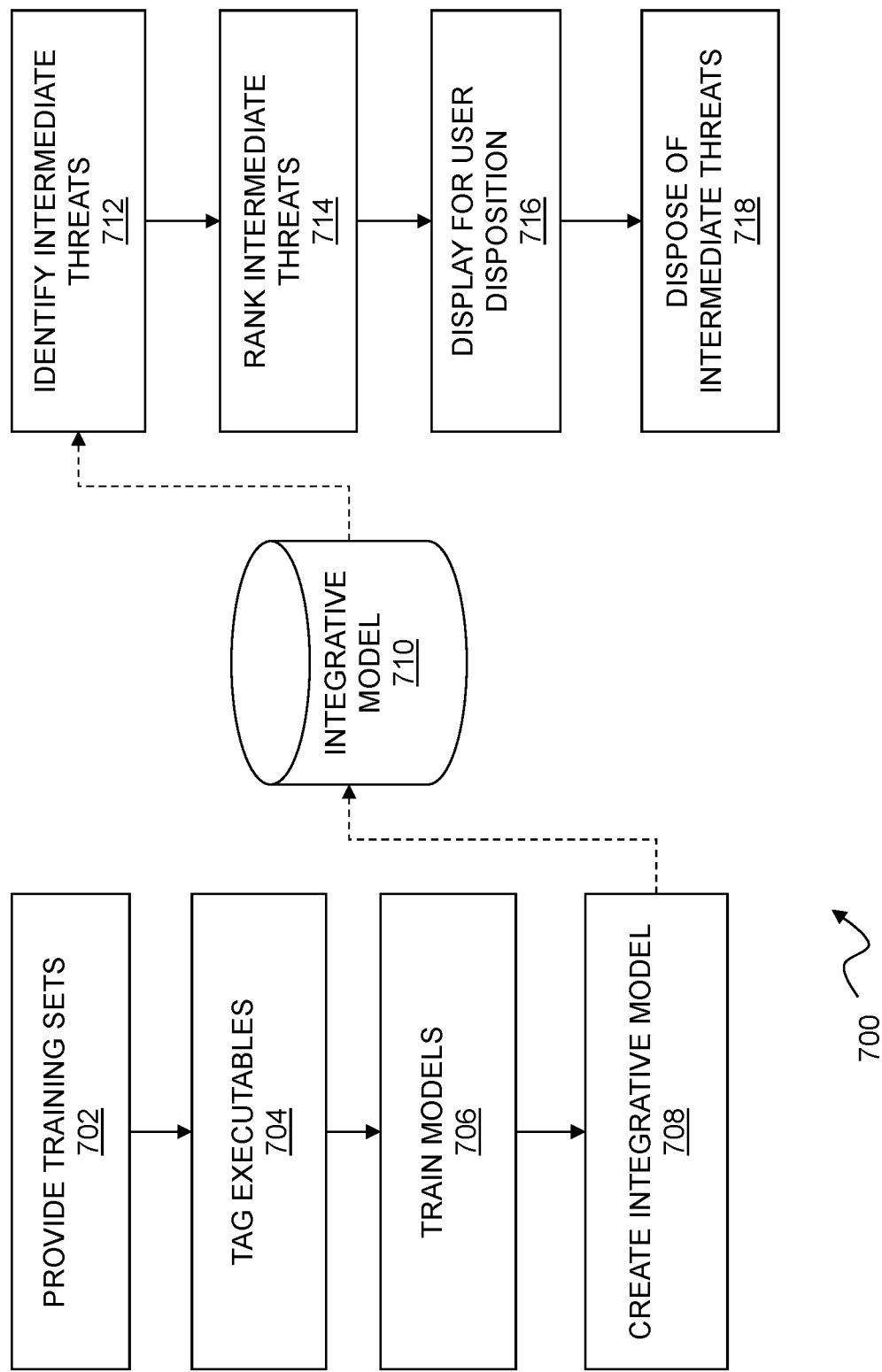
FIG. 7 shows a flow chart of a method for computer assisted identification of intermediate threats.

FIG. 7 shows a flow chart of a method for computer assisted identification of intermediate threats. In general, an ensemble of detection techniques are used to identify potential threats that present intermediate levels of threat. For example, an ensemble of machine learning techniques may be used to evaluate suspiciousness based on binaries, file paths, behaviors, reputation, and so forth, and potential threats may be sorted into safe, unsafe, and intermediate, or any similar categories. By filtering and prioritizing intermediate threats with these tools, human threat intervention can advantageously be directed toward threat samples and associated contexts most appropriate for non-automated responses.

As shown in step 702, the method 700 may include providing a training set including threat samples that are known to be safe and known to be malicious. This may, for example, include a random or curated training set of malicious and safe code, behaviors, user actions, network activities, messaging content, and so forth, or any combination of the foregoing. The training set may usefully be updated periodically as new sample of, e.g., known safe and known unsafe code are positively identified by a threat management facility or a third-party security service or the like.

As shown in step 704, the method 700 may include tagging each one of the threat samples with one or more tags that identify corresponding, observed behavior. This may, for example, include automatic tagging of threat samples based on models of known behavior, code, and so forth, or this may include clustering or other unsupervised machine learning analysis. Tagging may also or instead include human sorting and tagging according to empirical observations of behavior relevant or potentially relevant to security. This may also or instead include human sorting and curating of machine-assigned tags. Tags may identify malware types (e.g., spyware, adware, advanced persistent threat, ransomware, and so forth) or general behavioral characteristics (unpacker). In one aspect, these semantic tags may be assigned continuous values based on relative similarity to one or more known semantic types. This information may be used, e.g., in training to provide hints about the likely nature of unknown threat samples with similar features. The resulting tags may be used when training models, and may advantageously permit a neural network or other machine learning model to simultaneously draw multiple inferences about a new threat sample.

As shown in step 706, the method 700 may include training models for threat identification or evaluation. For example, this may include training a first machine learning model to identify malicious code in the training set based on the one or more tags, or otherwise training the machine learning model to identify code with malicious behavior using a training set including threat samples that are known to be safe and threat samples that are known to be malicious. Other machine learning models and techniques may also or instead be usefully created to support an ensemble machine learning approach to threat detection and analysis. Thus, for example, this may include training a second machine learning model to identify threats in the training set based on a corresponding file path for each of the threat samples, or otherwise training the second machine learning model to identify malicious or potentially malicious code based on a file path using a training set including threat samples that are known to be safe and threat samples that are known to be malicious. This may also or instead include training a third machine learning model to identify malicious code in the training set based on one or more Uniform Resource Locators (or other network addresses, remote resource identifiers, or the like) contained in a threat sample, or otherwise training the third model to identify potential threat samples based on a Uniform Resource Locator or the like found in a training set including threat samples that are known to be safe and threat samples that are known to be malicious.

As shown in step 708, the method 700 may include creating an integrative model 710 that evaluates a probability that an unknown threat sample is malicious based on a combination of the first machine learning model, the second machine learning model, and the third machine learning model. For example, this may include creating an integrative model 710 that evaluates a potential threat by a threat sample based on a combination of a first model configured to identify malicious code based on behavioral tags, a second model configured to identify malicious code based on an executable file path, and a third model configured to identify malicious code based on a Uniform Resource Locator within the threat sample or accessed by the threat sample, or any combination of these and/or any other machine learning models or the like. In one aspect, the integrative model 710 may also generally evaluate potential threats based on a context for a threat sample. For example, the context may include a reputation for the threat sample, a user executing a process associated with the threat sample, one or more files accessed by the threat sample, or any other context or other information available to the integrative model 710 and useful for assessing potential threats.

More generally, any other information may be used in combination with the ensemble of machine learning techniques described above as necessary or helpful to improve estimates of riskiness. Further, other machine learning models may be used in addition to or instead of the machine learning models described above, to the extent that such model(s) can be trained to accurately or usefully estimate risk. Thus, for example, if a machine learning model can be trained to accurately identify threats based on, e.g., access control lists, certificates, signatures, hashes, communications protocols, content, and so forth. Further, it may be advantageous to design and apply a group of machine learning models with detection techniques that are generally uncorrelated to one another in order to provide greater sensitivity to various types of threats.

As shown in step 712, the method 700 may include identifying intermediate threats. Threats samples such as executables that are known to be safe or known to be unsafe can be easily disposed of automatically. Similarly, threat samples that are very likely safe or unsafe, e.g., within a predetermined threshold of likelihood, can typically be safely disposed of without human intervention. However, intermediate threats—threats that are not within a predetermined likelihood of being safe or unsafe—present significant challenges to machine learning models that rely more on pattern matching than causal relationships or explanations to discriminate among safe and unsafe threat samples. Thus, the method 700 contemplated herein can usefully identify intermediate threats and elevate these items for human intervention. This may, for example, include determining if a new threat sample is an intermediate threat, such as a threat that fails to fall within a first predetermined threshold of likely safe or within a second predetermined threshold of likely malicious based on a probability calculated by the integrative model. In another aspect, this may include identifying a new threat sample (or other threat sample) as an intermediate threat when the new threat sample is not within a predetermined confidence level of safe code or malicious code according to the integrative model.

It will be understood that a threat sample, as used herein, may include any of a variety of samples suitable for assessing actual or potential threats to an enterprise network. For example, a threat sample may include a computing object such as executable code in the form of compiled code or object code, or executing code including without limitation a code sample, a process, a script, an executable or other code sample. This may also instead include any other computing object suitable for, e.g., a behavioral analysis, a signature analysis, an evaluation by a machine learning model, or the like. In another aspect, a threat sample may include a data structure or the like such as a file, cache, registry, or other data repository. The threat sample may also or instead include events such as actions by code, changes to data, access to remote network resources, receipt or transmittal of electronic communications, uploads or downloads of data, connections to devices such as USB drives, user interactions through a user interface, or any other events or the like that can be instrumented and monitored on an endpoint. These various types of threat samples may be used alone or in any combination to assist in detecting and evaluating intermediate threats as contemplated herein.

As shown in step 714, the method 700 may include ranking the intermediate threats identified in step 714. This may include a ranking based on an estimated suspiciousness or threat based on, e.g., the likelihood of being safe or unsafe according to the integrative model 710, the number of similar threat samples that are known to be safe or unsafe, and/or any other context relevant to evaluating the potential threat posed by a threat sample. More generally, any technique for prioritizing unknown threat samples so that a human user can direct attention toward potentially riskier items may usefully be employed to rank the intermediate threats as contemplated herein. The ranked intermediate threats may be organized into a list or other data structure or the like for subsequent display to a user.

As shown in step 716, the method 700 may include displaying intermediate threats for user disposition. For example, this may include conditionally presenting a new threat sample for human intervention when the probability calculated by the integrative model identifies the new threat sample as an intermediate threat, and/or when the threat sample is ranked sufficiently high relative to other intermediate threats as described above. Displaying the intermediate threats may include providing a user interface for presenting the new threat sample with the intermediate threat for human evaluation. This may also or instead include displaying a plurality of intermediate threats, each failing to fall within the first predetermined threshold and the second predetermined threshold, in a user interface. As described above, the plurality of intermediate threats may be ranked according to likelihood of threat, or any other metric or combination of metrics such as similarity to known malicious code, other indicia of malware or other threats, and so forth. Thus, the user interface may present the new threat sample in a list of a number of intermediate threats detected on an endpoint (or more generally in an enterprise network) and ranked according to a likelihood of threat. In one aspect, the plurality of intermediate threats may be ranked according to a combination of likelihood of threat and estimated business value (e.g., of one or more files associated with each of the intermediate threats) so that human intervention can also or instead be directed toward items posing a greater economic risk to an enterprise.

As shown in step 718, the method 700 may also include disposing of intermediate threats, such as through user interactions with information presented in the user interface. In one aspect, the user interface may include one or more tools for receiving a user evaluation of one of the threat samples that presents the intermediate threat. This may also or instead include one or more tools for remediating a threat associated with the threat sample.

According to the foregoing, there is also disclosed herein a system for computer assisted identification of intermediate threats. The system may include a memory storing an integrative model configured to evaluate a potential threat by a threat sample based on a combination of a first model configured to identify malicious code based on behavioral tags, a second model configured to identify malicious code based on an executable file path, and a third model configured to identify malicious code based on a Uniform Resource Locator within the threat sample. The system may also include a threat management facility configured to apply the integrative model to a new threat sample and to identify a new threat sample as an intermediate threat. The system may also include a web server configured to display the intermediate threat in a user interface on an endpoint for evaluation. The web server may also or instead be configured to present additional contextual information for the intermediate threat to a user through the user interface. The web server may also or instead be configured to receive an evaluation of the intermediate threat from a user through the user interface.

Figure 8:
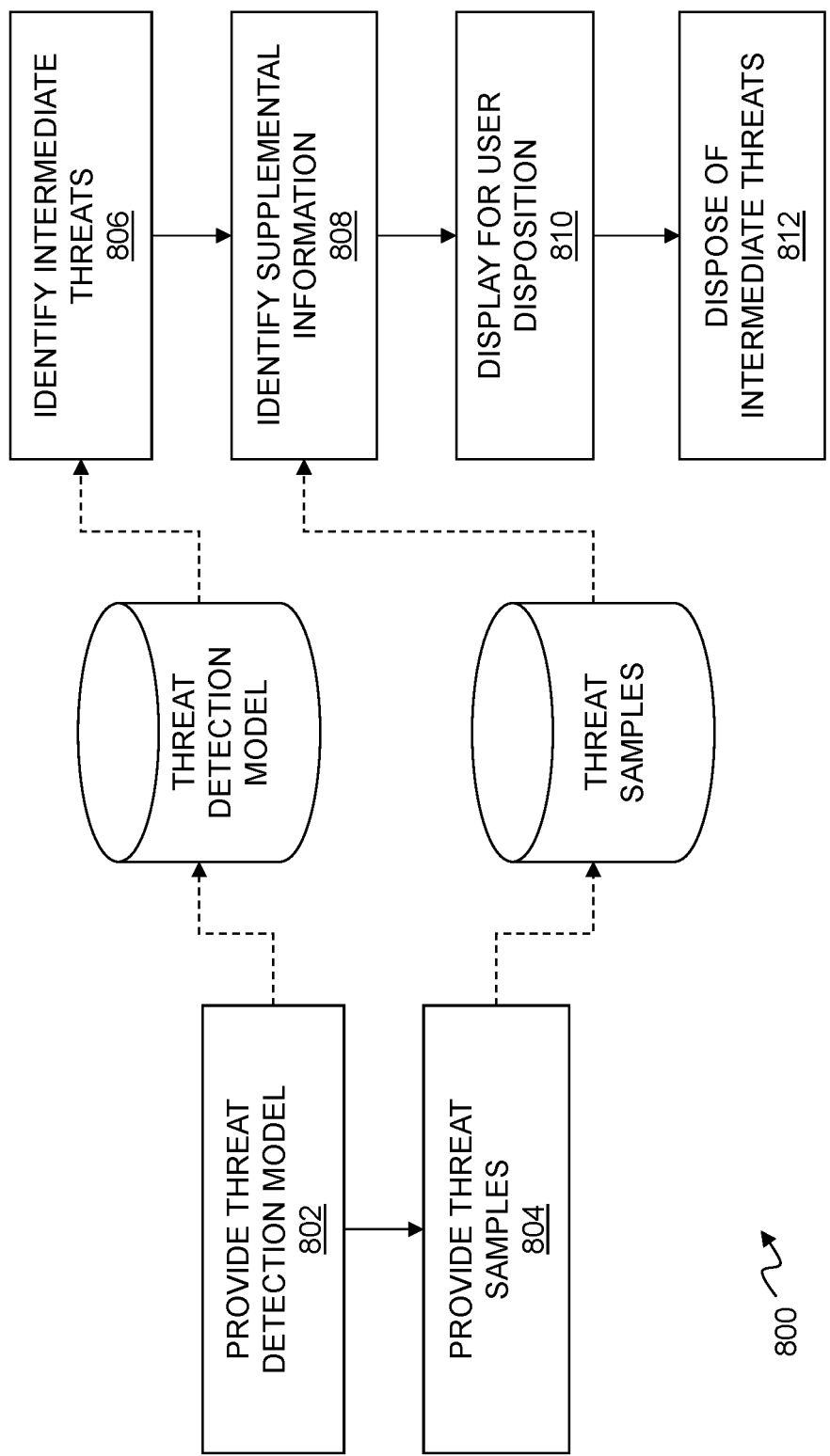
FIG. 8 shows a flow chart of a method for computer augmented threat evaluation.

FIG. 8 shows a flow chart of a method for computer augmented threat evaluation. In general, an automated system attempts to characterize code as safe or unsafe. For intermediate threat samples that are not placed with sufficient confidence in either category, human-readable analysis is automatically generated, such as qualitative or quantitative comparisons to previously categorized threat samples, in order to assist a human reviewer in reaching a final disposition. For example, a random forest over human-interpretable features may be created and used to identify suspicious features in a manner that is understandable to, and actionable by, a human reviewer. Similarly, a k-nearest neighbor algorithm or similar technique may be used to identify similar samples of known safe and unsafe code based on a model for one or more of a file path, a URL, an executable, and so forth. Similar code may then be displayed along with other information to a user for evaluation in a user interface. This comparative information can substantially improve the speed and accuracy of human interventions by providing richer context for human review of potential threats.

As shown in step 802, the method 800 may include providing a model such as a threat detection model for evaluating a likelihood that a threat sample is at least one of safe or malicious based on a training set of known threat samples. This may include any of the machine learning models or other threat detection models contemplated herein. As shown in step 804, the method 800 may also include providing threat samples such as samples of code that are known to be safe and samples of code that are known to be malicious. This may also or instead include known safe and unsafe samples of network activity, file content, file activity, behaviors, events, and so forth. The threat detection model may include a machine learning model trained using these threat samples, or any other suitable training set, or some combination of these. Thus, providing the model may include training a machine learning model to identify malicious code in a training set including threat samples that are known to be safe and known to be malicious.

The model may include a model for evaluating a likelihood that a threat sample is at least one of safe or malicious based on a training set of known threat samples. The model may also or instead include an integrative model that evaluates a potential threat by a threat sample based on a combination of a first model configured to identify malicious code based on behavioral tags, a second model configured to identify malicious code based on an executable file path, and a third model configured to identify malicious code based on a Uniform Resource Locator within the threat sample, or any of the other integrative models contemplated herein.

As shown in step 806, the method 800 may include identifying intermediate threats. For example, this may include identifying a new threat sample as an intermediate threat that is not within a predetermined likelihood of being malicious or safe according to the model, or using any of the other techniques described herein.

As shown in step 808, the method 800 may include identifying supplemental information relevant to evaluation of the new threat sample, such as relevant features of the new threat sample contributing to an inference of malicious code.

For example, the method 800 may include identifying one or more features, such as relevant features of the new threat sample associated with an inference of malicious code, using a random forest over human-interpretable features associated with an inference of malicious code in the training set of known threat samples (or any other suitable training set or the like). Random forests or random decision forests are an ensemble learning method for classification, regression and other tasks, that operate by constructing a multitude of decision trees at training time and outputting the class that is the mode of the classes (classification) or mean prediction (regression) of the individual trees. As a significant advantage, the structure of the decision tree(s) can be organized around human-interpretable features such as whether a threat sample is signed or whether the threat sample opens new files during execution. While the creation of a random forest is generally computationally expensive, and other more efficient techniques are known for automated classification, the output of a random forest over human-interpretable features can provide highly useful context to a human reviewer when evaluating intermediate threats as contemplated herein, and thus provides particular advantages over other classification techniques in this context, even when used in addition to other (possibly more computationally efficient) classification models and techniques for evaluating riskiness of unknown threat samples.

Identifying supplemental information may also or instead include identifying similar threat samples known to be safe or malicious including one or more safe threat samples similar to the new threat sample and one or more malicious threat samples similar to the new threat sample. In this context, similarity may usefully be computed based on a k-nearest neighbor algorithm. The similar threat samples may, for example, include a list of safe threat samples ranked based on similarity to the new threat sample according to the k-nearest neighbor algorithm, which may in turn be presented as a ranked list in a user interface. The similar code may also or instead include a list of malicious threat samples ranked based on similarity to the new threat sample according to the k-nearest neighbor algorithm. Using these ranked lists, a user may advantageously be presented with an ordered list of nearest, known safe threat samples and nearest, known unsafe samples. A k-nearest neighbor algorithm is a non-parametric method that assigns a new item to a particular class based on a closest neighbor within a (usually multi-dimensional) features space for training data.

While this approach provides a computationally efficient technique for evaluating similarity for certain data types, it will be understood that other computational measures of similarity are known in the art, and may usefully be employed to evaluate similarity of a new threat sample to known safe an unsafe threat samples as contemplated herein. For example, a nearest centroid classifier or nearest prototype classifier uses a classification model that assigns a classification based on a closest centroid that may be used to assess similarity as contemplated herein. As another example, an n-gram analysis supports efficient approximate matching and may be used to perform fast, large scale similarity analysis for a given file path over a large database of known malicious and known benign file paths and URLs.

While certain portions of this description emphasize the analysis of executables for detection of suspiciousness or the identification of intermediate threats, it should be understood that the term "threat sample" is not so limited. Other threat samples based on, e.g., files, caches, or other data sources may be used. Events, e.g., in a filtered event stream may also or instead be used, and the techniques described herein for use with code samples are also generally applicable to other threat samples instead of explicit computer code such as network activity, content, event streams that identify activities or behaviors, and so forth. Thus, for example, activities such as visiting a particular URL, opening an attachment, sending an electronic mail, or other events may also or instead be analyzed as threat samples by an integrative model or other threat detection tools to identify potential malware threats on an endpoint or group of endpoints.

As shown in step 810, the method 800 may include displaying the intermediate threat(s) and supplemental information in a user interface for user disposition, or otherwise augmenting a description of the new threat sample in a user interface with the supplemental information. This may, for example, include presenting a description of the new threat sample, the one or more relevant features, and the similar threat samples in a user interface. In one aspect, the method may include displaying a list of the similar threat samples ranked according to similarity to the new threat sample using, e.g., a k-nearest neighbor algorithm or any other suitable technique for measuring similarity. This may, for example, include similarity of executable code, similarity of behaviors, similarity of filenames, similarity of URL's called, or similarity of any other objective feature or combination of features that can be correlated to risk (or lack of risk). In one aspect, a number of the most similar safe samples and a number of the most similar unsafe samples may be presented together, and ranked, e.g., based on relative threat or based on similarity. The threat samples may be displayed along with descriptive information, attributes, behavioral characteristics, metadata and so forth, as well as any other information that might help a human user assess relative similarity when disposing of the current, new threat sample.

More generally, any supplemental information that might be helpful to a user in assessing a new threat sample may usefully be gathered and displayed to the user. For example, this may include augmenting the description of the new threat sample with a reputation of the new threat sample, e.g., based on reputation information available from a threat management facility. This may also or instead include augmenting the description of the new threat sample with a suspiciousness score based on a genetic analysis of features of the new threat sample. In another aspect, this may include augmenting the description of the new threat sample with contextual information such as users, related processes, associated data sources or files used by the threat sample, signature analysis, behavioral analysis, software update history or status for the endpoint, and so forth.

As shown in step 812, the method 800 may include disposing of the intermediate threat(s), such as by receiving user input through the user interface categorizing the new threat sample as safe, unsafe, or undetermined. Thus, in one aspect, the user interface may be configured to receive a user input categorizing the new threat sample as safe, unsafe or undetermined. Where a disposition as unsafe does not automatically initiate a remedial action, the user interface may also be configured to receive an express instruction for a remedial action such as any of the remedial actions described herein, or any other actions suitable for disposing of or otherwise managing a new threat. In another aspect, the user interface may be configured to receive user input to adjust filtering of an event stream from an endpoint that provided the new threat sample, which may permit an increase or decrease in the amount of event reporting from the endpoint instead of, or in addition to, a specific characterization of the new threat sample.

In another aspect, a system as contemplated herein includes a memory storing a first model for evaluating a likelihood that a threat sample is at least one of safe or malicious, a second model characterizing a manner in which a number of human-interpretable features contribute to an evaluation of suspiciousness of a file, and a third model for evaluating similarity of threat samples. The system may include a threat management facility including a processor configured to apply the first model to identify a new threat sample as an intermediate threat when the new threat sample is not within a predetermined likelihood of being malicious or safe according to the first model. The system may also include a web server configured to present a user interface including a description of the intermediate threat, augmented by one or more features of the intermediate threat identified with the second model and one or more similar threat samples identified with the third model, the web server further configured to receive input from a user through the user interface disposing of the intermediate threat. Disposing of the intermediate threat may include remediating the intermediate threat. Disposing of the intermediate threat may also or instead include characterizing the intermediate threat as safe, unsafe or undetermined.

Figure 9A:
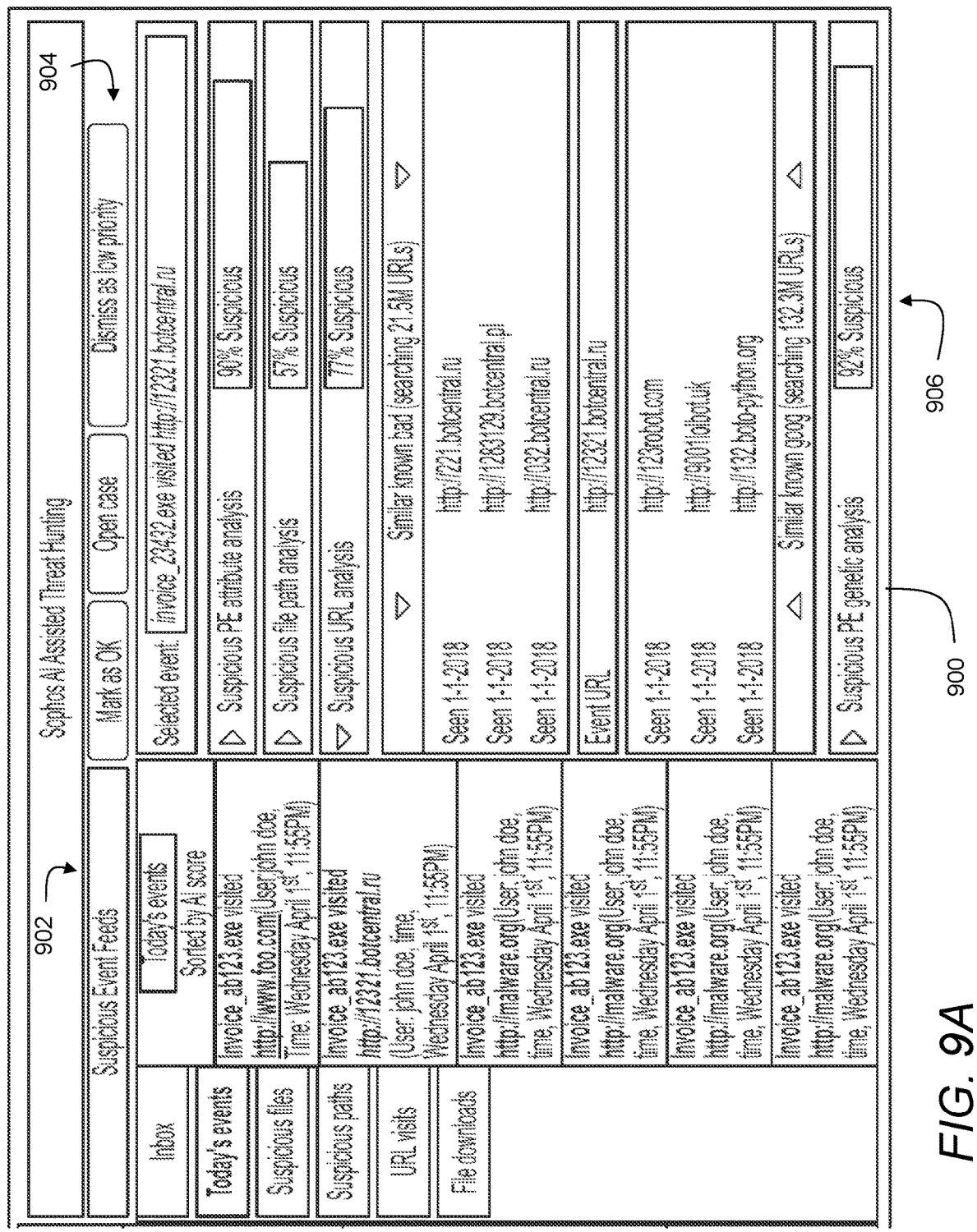
FIG. 9A shows a user interface for managing intermediate threats in an enterprise network.

FIG. 9A shows a user interface for managing intermediate threats in an enterprise network. The user interface 900 may be provided, e.g., as a web page or other content presented from the threat management facility for display on a user device such as an end user endpoint. The user interface 900 may show a feed 902 of suspicious events. The events within this feed 902 may be sorted, e.g., into files, URL visits, executables, processes, downloads, and so forth, or any other useful categories for review, or the events may be combined into a single feed. As noted above, threat samples may include executable code, however, the techniques contemplated herein may also or instead be applied to threat samples such as files, network activity, or streams of event data.

A variety of tools 904 for explicit disposition of new threat samples may be provided. For example, the user interface 900 may include tools 904 such as buttons or similar controls for a user to mark a particular event as, e.g., safe, unsafe, low priority, unknown or the like. The user interface 900 may also provide controls for querying the enterprise network for additional information, for adjusting filtering of event streams from endpoint data recorders, for initiating scans or other analysis, and so forth.

In one aspect, the user interface 900 may display a window 906 with more granular information about features contributing to suspiciousness. For example, an analysis of a threat sample may return a 90% suspicion of malicious code, while a file path analysis may return a 57% suspicion, and a URL analysis may return a 77% suspicion. While an integrative model may combine these various features into a single estimate of suspiciousness or potential risk, the individual values may be useful to a user attempting to manually dispose of an intermediate threat. Furthermore, for any particular feature (e.g., the URL analysis in FIG. 9), a number of most similar events or threat samples for that feature may be displayed, with similarity evaluated using, e.g., a k-nearest neighbor algorithm or other algorithm for evaluating similarity within a feature space. These more granular estimates of suspiciousness may be presented in separate sub-windows, which may usefully be arranged in an accordion, a stacked group of drop-down lists, or any other suitable control element or combination of control elements that permits each type of estimate to be expanded or collapsed under user control.

Figure 9B:
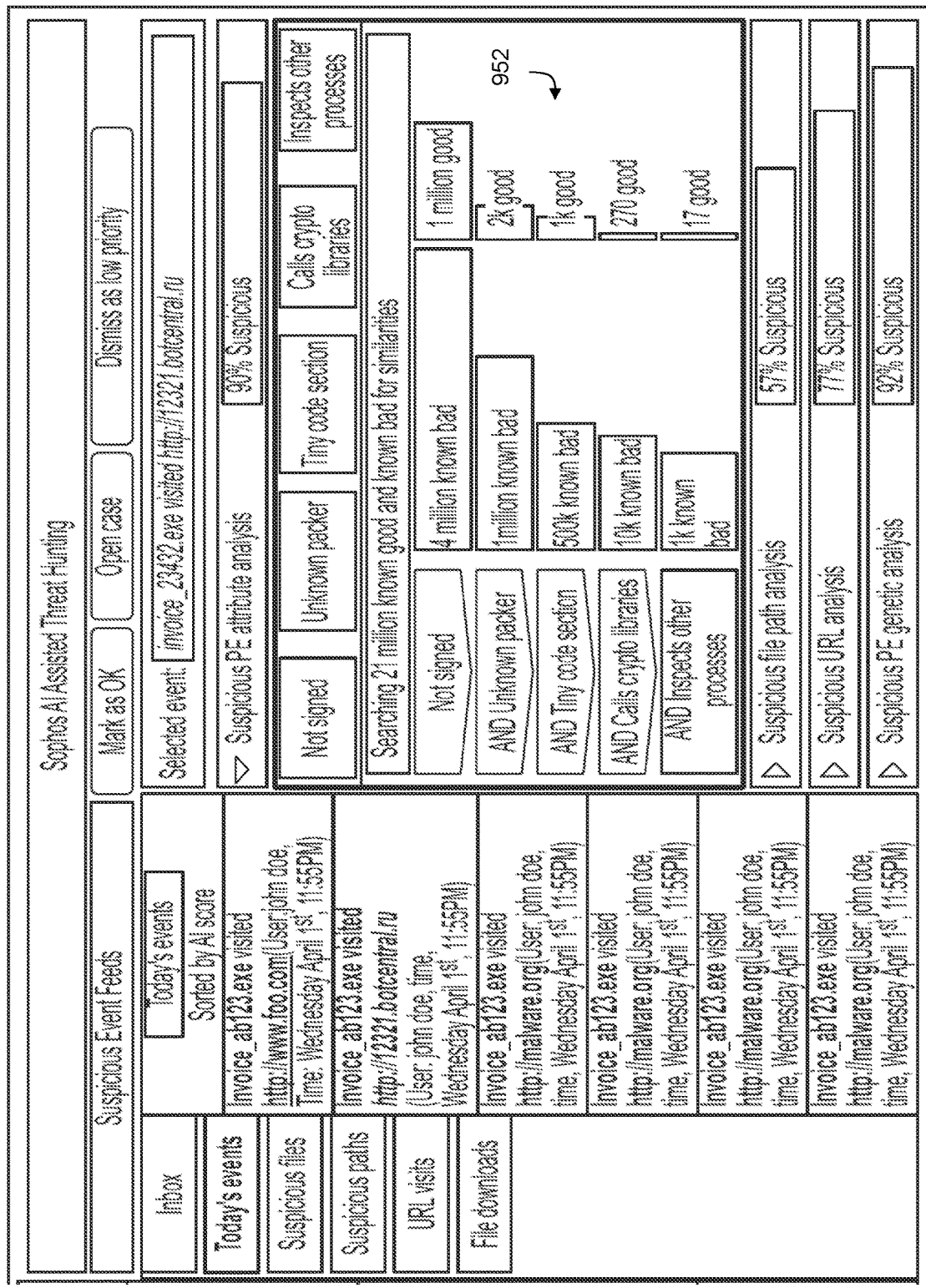
FIG. 9B shows a user interface for managing intermediate threats in an enterprise network.

FIG. 9B shows a user interface for managing intermediate threats in an enterprise network. The user interface 950 may, for example, include any of the user interfaces described herein.

In one aspect, the user interface 950 may show a window 952 listing human interpretable features contributing to an estimate of suspiciousness. For example, the user interface 950 may present particular features in the window 952 such as whether a threat sample is signed, whether the threat sample calls cryptographic libraries, and whether the threat sample inspects other processes. For each such feature, the user interface 950 may further present the number of known good and known bad threat samples for that feature, with the features progressively nested according to the hierarchy of a random The features displayed in this list may be a subset of features in a random forest over human-interpretable features that is selected based on relevance, e.g., how strongly indicative those features are of safety or suspiciousness. In one aspect, this may include features that are most heavily weighted on a percentage basis toward safety or suspiciousness. In another aspect, this may include features with the largest number of relevant samples (e.g., higher up the decision tree). In another aspect, these and any other factors may be weighted or otherwise collectively evaluated to select a subset of features for display to a user. This approach may usefully assist a human user when evaluating an intermediate threat for manual disposition by providing a display of features that contribute more significantly or most significantly to the potential risk associated with a threat sample.

In another aspect, the user interface may provide a display of the random forest output (e.g., quantitative data about various human-interpretable features), or a display of most similar safe and unsafe threat samples, or some combination of these. For example, the user interface may provide one or more user controls for the user to select among these different analyses, and/or other analyses, contextual information, or other supplemental information.

Figure 10:
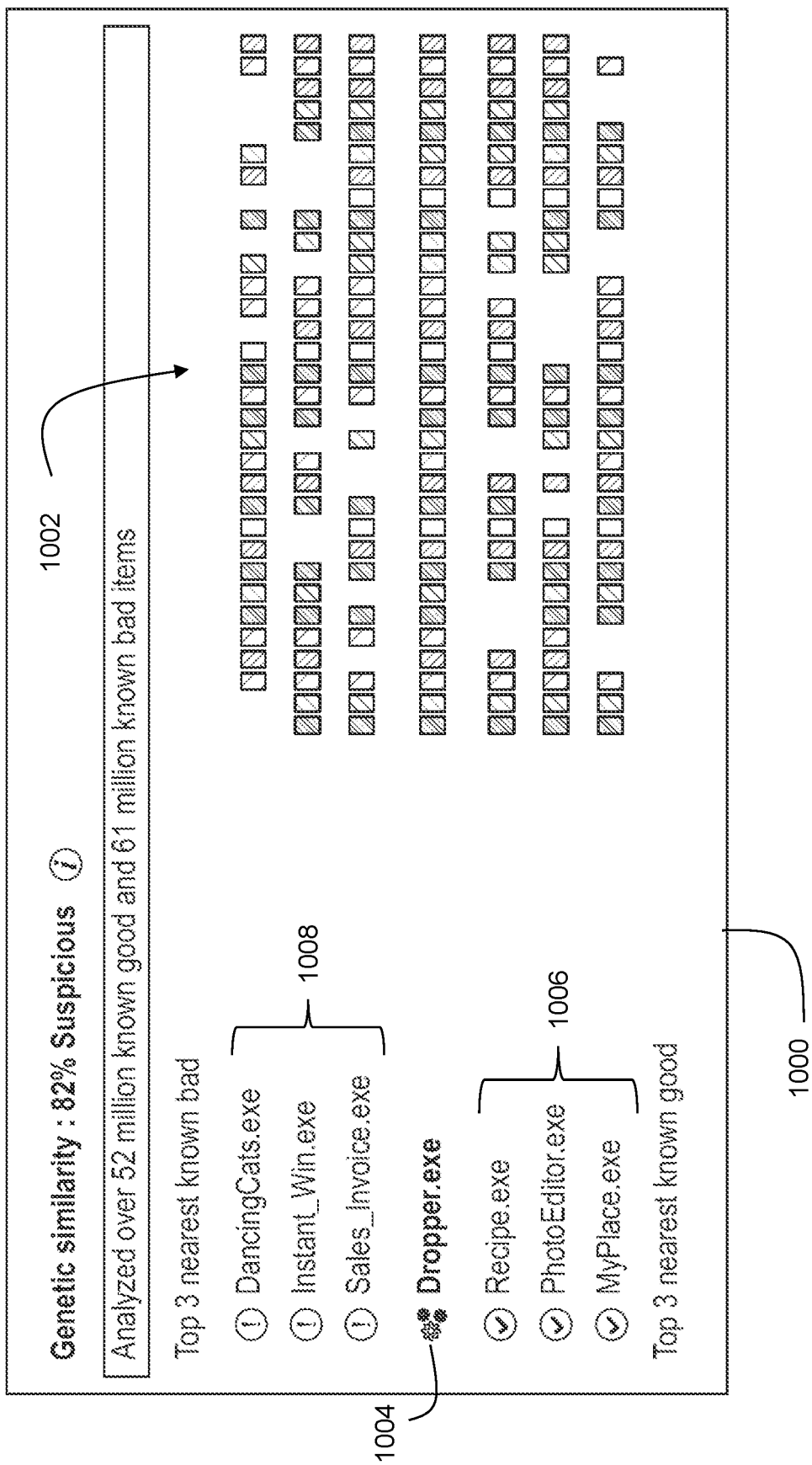
FIG. 10 shows a user interface for managing intermediate threats in an enterprise network.

FIG. 10 shows a user interface for managing intermediate threats in an enterprise network. In general, the user interface 1000 may include a map 1002 of the genetic composition of an intermediate threat sample 1004 and similar sets of safe threat samples 1006 and unsafe threat samples 1008. The map 1002 may show, for each of the known threat samples, the presence and absence of a number of genetic features that are present in the unknown, intermediate threat sample 1004. The genetic features may be any features useful for characterizing threat samples including, without limitation, behaviors, associated events, file activities, network activity, signatures, certificates, source information, file content, source code, context, and so forth. As a significant advantage, this permits a visual assessment of behavioral similarity (or other genetic information) by a human reviewer independent of machine learning and other computerized analysis.

Figure 11:
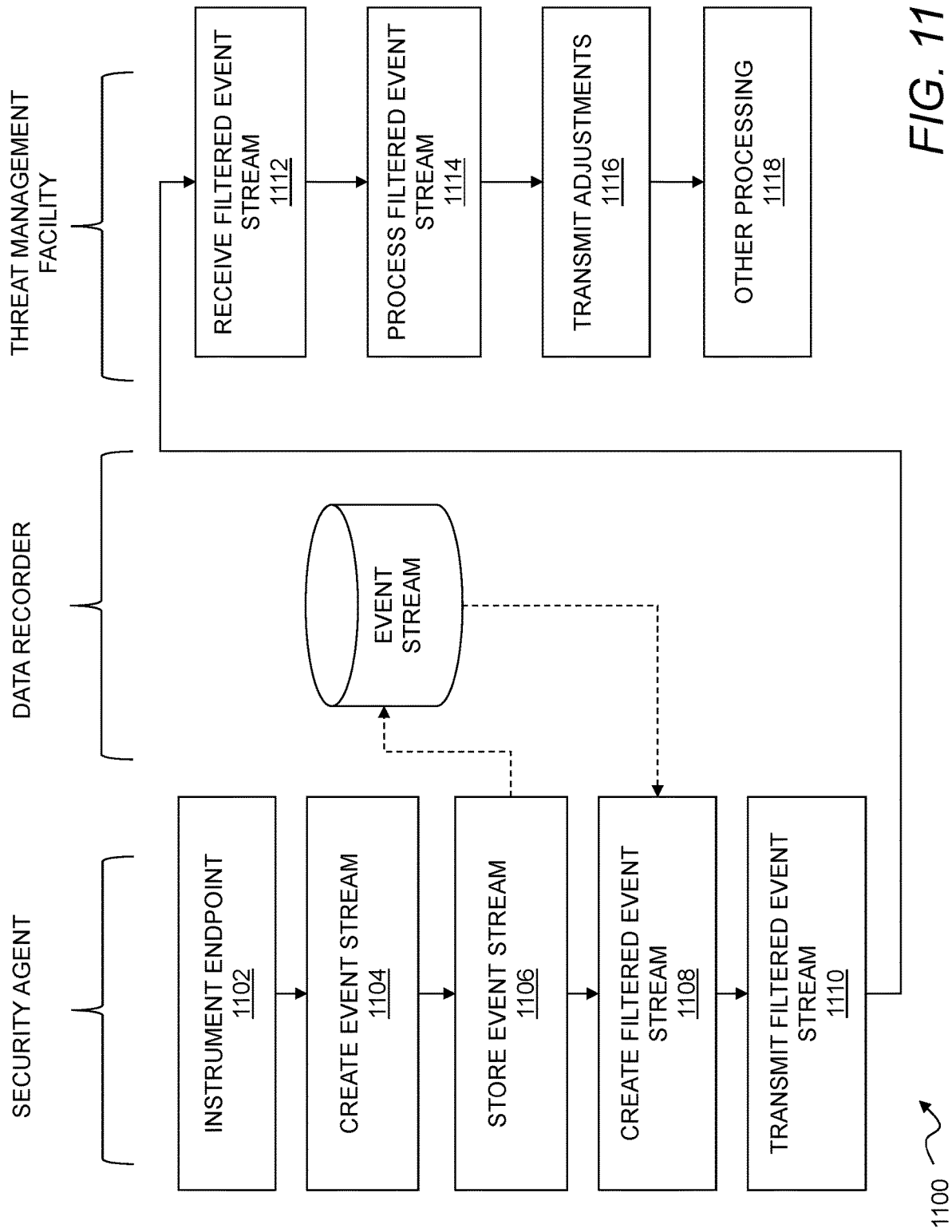
FIG. 11 shows a flow chart of a method for dynamic filtering of endpoint event streams.

FIG. 11 shows a flow chart of a method for dynamic filtering of endpoint event streams. In general, activity on an endpoint is monitored in two stages with a local agent. In a first stage, particular computing objects on the endpoint are selected for tracking. In a second stage, particular types of changes to those objects are selected. By selecting objects and object changes in this manner, a compact data stream of information highly relevant to threat detection can be provided from an endpoint to a central threat management facility. In order to support dynamic threat response, the locus and level of detection applied by the local agent can be controlled by the threat management facility.

As shown in step 1102, the method 1100 may include instrumenting the endpoint, e.g. with a local agent, to detect a plurality of types of changes to a plurality of computing objects. In general, the changes may be any of the events or other actions described herein, and the computing objects may be any of the computing objects described herein. For example, the computing objects may include a number of files, a number of processes, and/or a number of executables. The computing objects may also or instead include one or more of an electronic communication, a registry of system settings, a secure kernel cache, or any other data or data structure stored on an endpoint or communicated to or from the endpoint. Similarly, the types of changes may be any types of changes that might usefully be monitored in a threat management context as contemplated herein. For example, the endpoint may be instrumented to detect file reads and writes, but not file opens or closes. Or the endpoint may be instrumented to monitor inbound and outbound electronic mail, but not outbound electronic mail to other users within the enterprise. As another example, the endpoint may be instrumented to monitor changes to operating system registry entries by non-system processes, or to monitor read/write activity that substantially increases file entropy. More generally, any types of changes that might contribute to a determination of suspiciousness or safety can usefully be monitored, with instrumentation of suitable, corresponding computing objects, all as contemplated herein.

As shown in step 1104, the method 1100 may include creating an event stream from the local agent including each type of change to each of the computing objects detected on the endpoint.

As shown in step 1106, the method 1100 may include storing the event stream in a data recorder on the endpoint. This may generally be an unfiltered event stream containing additional event data not including in a filtered event stream that is sent to a threat management facility, and may include some or all of the event data that the endpoint is instrumented to detect. For example, the unfiltered event stream may include additional ones of the plurality of types of changes to the plurality of computing objects in a filtered event stream, or changes to additional ones of the plurality of computing objects not included in the filtered event stream.

As shown in step 1108, the method 1100 may include processing the event stream with a filter at the endpoint to provide a filtered event stream including a subset of the types of changes to a subset of the computing objects. In one aspect, the subset of computing objects includes one or more of a file, an executable, a process, a database, and a message. In another aspect, the types of changes include at least one of a file read, a file write, a file copy, a file encrypt, a file decrypt, a network communication, a registry update, a software installation, a change in permissions, and a query to a remote resource. It will be understood that, while the filtered event stream is illustrated as flowing from the event stream stored by the data recorder, the filtered event stream may also or instead be created directly by a security agent as the unfiltered event stream is captured and forwarded to the data recorder for storage.

Processing the event stream with the filter may also include locally adjusting the filter at the endpoint, e.g., in response to local changes detected on or by the endpoint. For example, the level of filtering may be locally adjusted by the endpoint based on a reputation score for one or more processes, files or the like on the endpoint. This filtering may be done for all detectable events on the endpoint, or for specific processes. Thus, for example, when a reputation for a new process or other computing object is unknown, the endpoint may decrease filtering to provide greater data reporting to the threat management facility for that particular process. Thus, while step 1116 below contemplates controlling the filter from a central threat management facility or the like, the filter may also or instead be controlled locally on an endpoint in response to changes in security posture, policy compliance posture, or any other events, context, malware detections, and so forth.

In one aspect, the filtered event stream may be arranged around anchor points such as a file, a domain name, or any other useful piece of data or metadata for which the presence can be monitored on an endpoint. For example, a file hash may be created for a file and used to test for the presence of that file on endpoints throughout an enterprise. Whenever this anchor point, e.g., the corresponding file hash, is detected on an endpoint, a collection of related events, metadata, context and so forth may be added to the filtered event stream for reporting to a central threat management facility.

In another aspect, the level of filtering may be locally controlled based on factors or requirements other than threat detection. For example, an event stream may be filtered to remove personal identifying information, e.g., for compliance with data privacy regulations. As another example, filtering may be controlled based on network usage restrictions, e.g., so that a particular endpoint does not exceed a predetermined hourly, daily, or weekly quota of bandwidth for event reporting.

Further, it will be understood that the filtered event stream may include synthetic events that characterize other collections of events in a single event or condensed group of events. This approach advantageously permits more compact communication of relevant information to a threat management facility, as well as more compact storage of information on the endpoint. In one aspect, the synthetic events may be stored by the data recorder in place of (e.g., to reduce memory requirements) or in addition to (e.g., to reduce communications requirements while preserving a more complete log or related activity) more detailed logging of granular events on the endpoint. In another aspect, the data recorder may store complete event details, and the endpoint may (e.g., with the security agent) create synthetic events dynamically to facilitate more compact communication to the threat management facility.

As shown in step 1110, the method 1100 may include transmitting the filtered event stream to a threat management facility. The filtered event stream may be transmitted at any suitable frequency including periodic, aperiodic or other scheduled transmittal, as well as pushed transmittal (e.g., at intervals determined by the endpoint) or pulled transmittal (e.g., at intervals determined by the threat management facility, or any combination of these. Thus, for example, the endpoint (or security agent on the endpoint) may periodically report the filtered event stream on a predetermined schedule, with supplemental transmittals provided when the security agent detects a potential threat, or requested when the threat management facility detects a potential threat.

As shown in step 1112, the method 1100 may include receiving the filtered event stream at the threat management facility.

As shown in step 1114, the method 1100 may include processing the filtered event stream at the threat management facility to evaluate a security state of the endpoint. This may include any processing suitable for analyzing the events within the filtered event stream. For example, processing the filtered event stream may include searching for potential malicious activity on the endpoint, e.g., based on a pattern of activities within the filtered event stream, or based on a specific activity such as an unauthorized change to a registry entry. Processing the filtered event stream may also or instead include searching for a security exposure on the endpoint such as a missing security patch, a change in a firewall configuration, a de-installation of a malware scanner, and so forth. In another aspect, processing the filtered event stream may include securely verifying a status of the endpoint, e.g., with a secure heartbeat or the like from the endpoint, in order to ensure that the endpoint has not been otherwise compromised. In another aspect, processing the filtered event stream may include monitoring for changes that bring the endpoint out of compliance with a security policy for an enterprise, or otherwise present an actual or potential risk to network security for the enterprise.

As shown in step 1116, the method 1100 may include conditionally transmitting adjustments to filtering by the endpoint. For example, the method 1100 may include, in response to a predetermined security state detected by the threat management facility, transmitting an adjustment to the endpoint for at least one of the types of changes or the computing objects used by the filter to process the event stream. This may include transmitting an adjustment to a filter used by the endpoint to select which of the plurality of types of changes to the plurality of computing objects the data recorder reports in the filtered event stream. Thus, for example, when the security state indicated by the filtered event stream is a potentially compromised state of a file, process or the like, the threat management facility may decrease filtering in order to receive more data about various changes to or by computing objects on the endpoint. This may include general changes to the level of filtering, or targeted changes that focus on specific computing objects or types of changes that might be related to a potential compromise. In one aspect, the adjustment to endpoint filtering may include a change to the subset of types of changes included in the filtered event stream, such as by increasing the types of changes included in the filtered event stream when the endpoint is potentially compromised, or decreasing the types of changes included in the filtered event stream when a potential compromise has been remediated. The adjustment may also or instead include a change to the subset of computing objects included in the event stream, such as by monitoring additional processes, directories or the like when a potential compromise is detected.

Adjustments may also be made to filtering by other endpoints within an enterprise network. For example, where a compromise is detected on one endpoint, behaviors or other patterns detected in the (filtered) event stream for that endpoint may be used to adjust the filtering on other endpoints to facilitate the detection of similar or related patterns elsewhere within the enterprise network. Similarly, endpoints or data resources known to contain high business value assets may have filtering adjusted to facilitate more detailed and frequent monitoring of related assets.

In another aspect, filtering may be adjusted independently of the current filtered event stream, e.g., based on other context. For example, when an employee is about to leave a company, filtering may be reduced on or removed from any associated compute instances so that computing or network activity can be more closely monitored until departure.

As shown in step 1118, the method 1100 may include other processing based on the filtered event stream. For example, the method 1100 may include correlating the filtered event stream to a malware event on the endpoint and searching for the malware event on one or more other endpoints coupled to the enterprise network based on a pattern of events in the filtered event stream. In another aspect, the method 1100 may include storing the filtered event stream at the threat management facility. In another aspect, the method 1100 may include, when the filtered event stream shows that the security state of the endpoint is compromised, initiating a remedial action, e.g., using any of the remediation tools available to the threat management facility.

According to the foregoing, there is also disclosed herein a system including an endpoint and a threat management facility. The endpoint may execute a data recorder to store an event stream including a plurality of types of changes to a plurality of computing objects detected on the endpoint, and the endpoint may execute a local agent to process the event stream with a filter into a filtered event stream including a subset of the plurality of types of changes to a subset of the plurality of computing objects. The local agent may be further configured to communicate the filtered event stream to a remote resource over a data network. The threat management facility may be configured to receive the filtered event stream from the endpoint and to process the filtered event stream to evaluate a security state of the endpoint. The threat management facility may be further configured to respond to a predetermined change in the security state by transmitting an adjustment to the endpoint for at least one of the types of changes or the computing objects used by the filter to process the event stream. In one aspect, the threat management facility may be configured to initiate a remediation of the endpoint when the security state of the endpoint is compromised.

Figure 12:
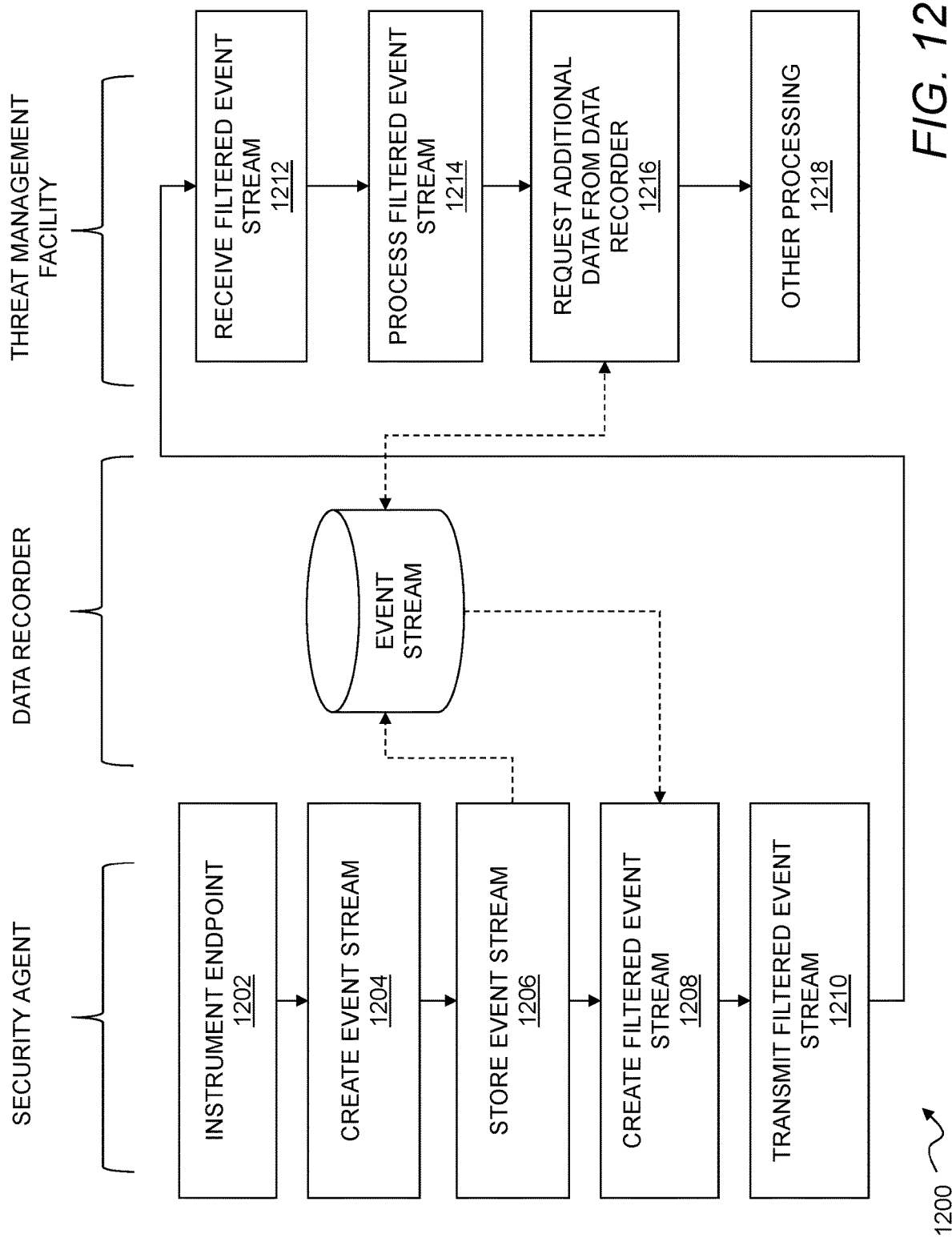
FIG. 12 shows a flow chart of a method for forensic query of local event streams in an enterprise network.

FIG. 12 shows a flow chart of a method for forensic query of local event streams in an enterprise network. In general, activity on an endpoint is monitored in two stages with a local agent. In a first stage, particular computing objects on the endpoint are selected for tracking. In a second stage, particular types of changes to those objects are selected. By selecting objects and object changes in this manner, a compact data stream of information highly relevant to threat detection can be provided from an endpoint to a central threat management facility. At the same time, a local data recorder creates a local record of a wider range of objects and changes. The system may support forensic activity by facilitating queries to the local data recorder on the endpoint to retrieve more complete records of local activity when the compact data stream does not adequately characterize a particular context.

As shown in step 1202, the method 1200 may include instrumenting the endpoint as described herein, e.g. with a local agent, to detect a plurality of types of changes to a plurality of computing objects. In general, the changes may be any of the events or other actions described herein, and the computing objects may be any of the computing objects described herein. For example, the computing objects may include a number of files, a number of processes, and/or a number of executables. The computing objects may also or instead include one or more of an electronic communication, a registry of system settings, and a secure kernel cache.

As shown in step 1204, the method 1200 may include creating an event stream from the local agent including, for example, each type of change to each of the computing objects detected on the endpoint.

As shown in step 1206, the method 1200 may include storing the event stream in a data recorder on the endpoint. As described above, this may generally be an unfiltered event stream containing additional event data not including in a filtered event stream that is sent to a threat management facility, such as some or all of the event data that the endpoint is instrumented to detect. For example, the unfiltered event stream may include additional ones of the plurality of types of changes to the plurality of computing objects in a filtered event stream, or one or more of the plurality of types of changes to additional ones of the plurality of computing objects.

As shown in step 1208, the method 1200 may include processing the event stream with a filter at the endpoint to provide a filtered event stream including a subset of the types of changes to a subset of the computing objects. In one aspect, the subset of computing objects includes one or more of a file, an executable, a process, a database, and a message. In another aspect, the types of changes include at least one of a file read, a file write, a file copy, a file encrypt, a file decrypt, a network communication, a registry update, a software installation, a change in permissions, and a query to a remote resource.

As shown in step 1210, the method 1200 may include transmitting the filtered event stream to a threat management facility, e.g., as described above.

As shown in step 1212, the method 1200 may include receiving the filtered event stream at the threat management facility.

As shown in step 1214, the method 1200 may include processing the filtered event stream at the threat management facility to evaluate a security state of the endpoint. This may include any processing suitable for the events within the filtered event stream. For example, processing the filtered event stream may include searching for potential malicious activity on the endpoint, e.g., based on a pattern of activities within the filtered event stream, or based on a specific activity such as an unauthorized change to a registry entry. Processing the filtered event stream may also or instead include searching for a security exposure on the endpoint such as a missing security patch, a change in a firewall configuration, a de-installation of a malware scanner, and so forth. In another aspect, processing the filtered event stream may include securely verifying a status of the endpoint, e.g., with a secure heartbeat or the like from the endpoint, in order to ensure that the endpoint has not been otherwise compromised. More generally, this may include any of the processing described herein that might usefully be performed by a threat management facility based on an event stream from one or more endpoints associated with an enterprise network.

As shown in step 1216, the method 1200 may include conditionally transmitting a request to the endpoint, or more specifically, the data recorder on the endpoint, for additional event data in the unfiltered event stream. For example, this may include, in response to a predetermined security state detected by the threat management facility, requesting additional event data from the data recorder for at least one of other ones of the types of changes than the subset of the types of changes or other ones of the plurality of computing objects than the subset of the computing objects. The request may include a request for all event data in an unfiltered event stream stored by the data recorder over a predetermined time window. The request may also or instead include a request for a larger group of types of changes or events from additional computing objects. The predetermined change in the security state may be any change raising suspicion or otherwise indicating that additional information may be useful for manual review, automated review, forensic documentation, or some combination of these. For example, the predetermined change in the security state of the endpoint may include an increased likelihood of malicious activity associated with the endpoint. The change may also or instead include a change in policy compliance, detection of known malware, suspicious network communications, access to highly valuable business assets, and so forth.

As shown in step 1218, the method 1200 may include other processing based on the filtered event stream. For example, the method 1200 may include correlating the filtered event stream to a malware event on the endpoint and searching for the malware event on one or more other endpoints coupled to the enterprise network based on a pattern of events in the filtered event stream. In another aspect, the method 1200 may include storing the filtered event stream at the threat management facility. In another aspect, the method 1200 may include, when the filtered event stream shows that the security state of the endpoint is compromised, initiating a remedial action, e.g., using any of the remediation tools available to the threat management facility. More generally, any action necessary or helpful for detecting, investigating, disposing of, or otherwise managing threats based on the filtered event stream may usefully be performed in this step.

According to the foregoing, in one aspect, there is disclosed herein a system including an endpoint and a threat management facility. The endpoint may execute a data recorder to store an event stream of event data including a plurality of types of changes to a plurality of computing objects detected on the endpoint. The endpoint may also execute a local agent configured to process the event stream with a filter into a filtered event stream including a subset of the plurality of types of changes to a subset of the plurality of computing objects. The local agent may be further configured to communicate the filtered event stream to a remote resource over a data network. The threat management facility may be configured to receive the filtered event stream from the endpoint and to process the filtered event stream to evaluate a security state of the endpoint, the threat management facility further configured to respond to a predetermined change in the security state by transmitting a request to the endpoint for additional event data stored by the data recorder. In one aspect, the threat management facility is further configured to initiate a remediation of the endpoint when the security state of the endpoint is compromised.

Figure 13:
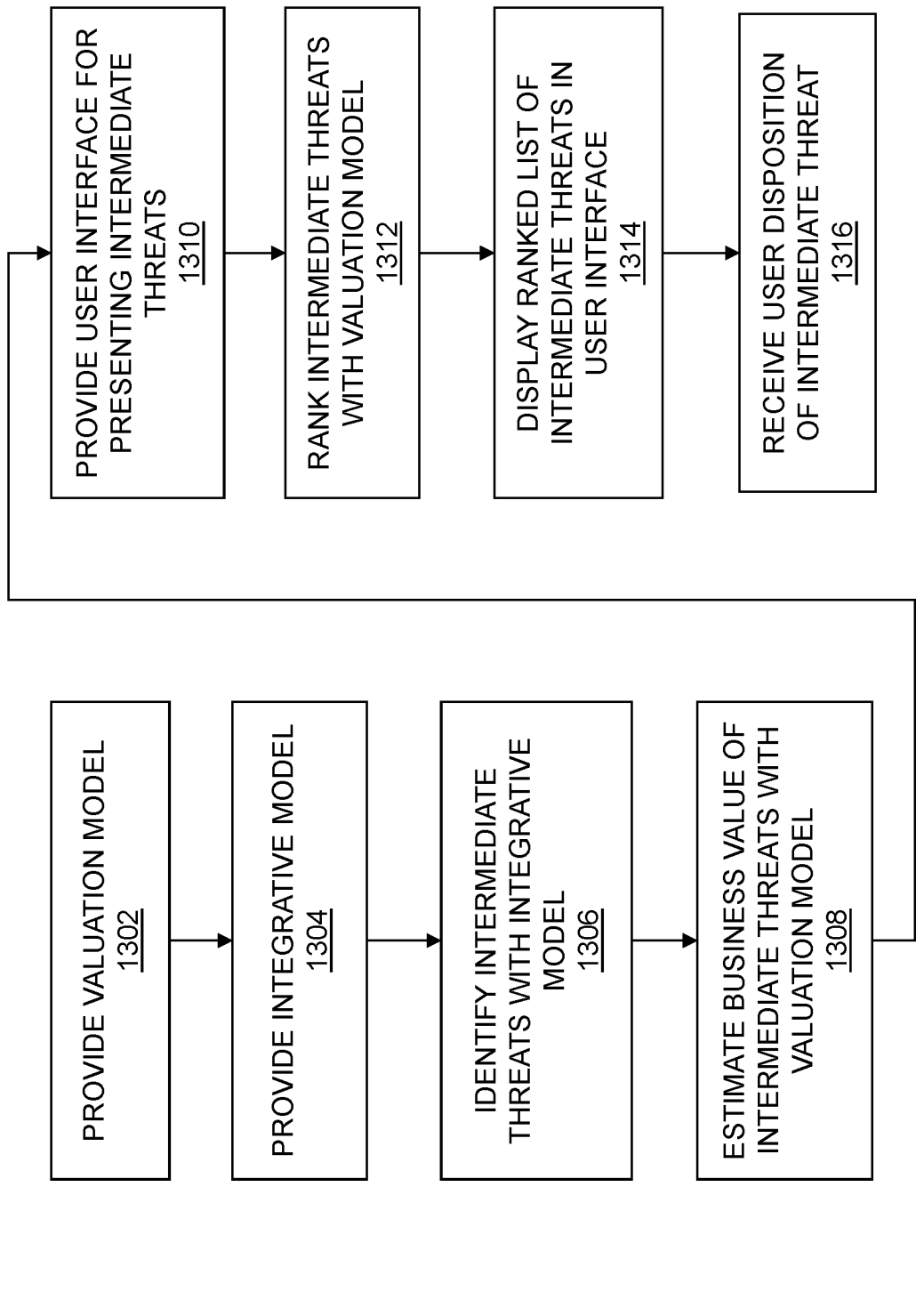
FIG. 13 shows a flow chart of a method for threat detection with business impact scoring.

FIG. 13 shows a flow chart of a method for threat detection with business impact scoring. In general, a computer model is created for automatically evaluating the business value of computing objects such as files and databases on an endpoint. This can be used to assess the potential business impact of a security compromise to an endpoint, or a process executing on an endpoint, in order to prioritize potential threats within an enterprise for human review and intervention.

As shown in step 1302, the method 1300 may include providing a valuation model for automatically estimating a business value of a file. Providing the valuation model may, for example, include training a machine learning algorithm to estimate the business value based on a training set of files each having a known business value. This may include training a machine learning model to recognize files with (known) high business value based on, e.g., ownership, authorship, content, access controls, and so forth. For example, the model may be trained to recognize credit card numbers, social security numbers, or other sensitive information including financial information, personal information, and other sensitive content within files indicative of actual or potential business value. The model may also or instead be trained to recognize potentially sensitive documents based on document type. For example, the model may be trained to classify documents as patent applications, resumes, financial statements, bank statements and so forth, with the corresponding classification used to assign an estimated value as appropriate.

This may also or instead include providing rules, regression models, heuristics, and so forth for identifying high business value files or otherwise estimating the value of files, data, content and the like. The valuation model may, for example, estimate value based on file location, based on an access control content, based on content, or based on any other context, usage, feature or combination of the foregoing. For example, the valuation model may estimate value based on one or more of encryption status, file type, file usage history, file creation date, file modification date, file content, and file author. More generally, this may include any human-interpretable features, or any other features useful for estimating business value, human-interpretable or otherwise, such as features independently identified by a clustering algorithm or other unsupervised machine learning technique.

These techniques may also or instead be used to estimate the business value of a machine or other domain based on the aggregated business value of files and the like within that estate. Thus, while the description herein focuses on business value on a file-by-file basis, the method 1300 contemplated herein may also or instead by used on a machine-by-machine basis or any other basis to estimate the business impact of potent threats.

As shown in step 1304, the method 1300 may include providing an integrative model, such as any of the integrative models described herein. For example, this may include creating an integrative model that evaluates a potential threat by a threat sample based on a combination of a first model configured to identify malicious code based on behavioral tags, a second model configured to identify malicious code based on an executable file path, and a third model configured to identify malicious code based on a Uniform Resource Locator within the threat sample. More generally, the integrative model may evaluate potential threats by computer objects based on one or more of file behavior, file signature, file path, Uniform Resource Locators accessed, or any other feature or combination of features suitable for assessing suspiciousness. The integrative model may also or instead include one or more machine learning models trained to recognize potentially malicious code based on a training set of known safe and known unsafe threat samples.

As shown in step 1306, the method 1300 may include identifying intermediate threats, e.g., with the integrative model. The one or more intermediate threats may include one or more computing objects with an objective score from the integrative model that are not within a predetermined confidence level of a safe score or a malicious score. The one or more computing objects may, for example, include a process, an executable, a file, and so forth. The one or more computing objects may also or instead include a registry of system settings, a secure kernel cache of process information, or any other data source, cache, resource or the like that might be usefully monitored for threat detection as contemplated herein.

Identifying intermediate threats may, for example, include configuring a threat management facility to evaluate new threat samples on endpoints within an enterprise network according to the integrative model based on, e.g., a filtered event stream as described herein, or any other technique or combination of techniques suitable for identifying code or other threat samples that cannot confidently be classified as safe or unsafe. Identifying intermediate threats may include evaluating new threat samples, such as by identifying one or more intermediate threats by any of the new threat samples that are not within a predetermined confidence level of safe code or malicious code according to the integrative model. It will be appreciated that, while an integrative model as contemplated herein is one useful model for identifying code that is not clearly safe or unsafe, other techniques for identifying intermediate threats may also or instead be used.

As shown in step 1308, the method 1300 may include estimating a business value of one or more intermediate threats with the valuation model described above. This may include generating an estimated dollar value of the contents of files accessed by a process or other computing object, or an estimated business impact of the public dissemination of information contained in such files. This may also or instead include generating a score otherwise indicative of business value based on any of the factors or features described herein.

As shown in step 1310, the method 1300 may include providing a user interface for presenting the one or more intermediate threats to a user for human evaluation. This may, for example, include any of the user interfaces described herein.

As shown in step 1312, the method 1300 may include ranking the one or more intermediate threats for presentation within the user interface, e.g., by ranking the intermediate threats with the valuation model described above. More generally, the intermediate threats may be ranked using any technique that reflects actual or potential business impact of the threat based on business value of affected data or compute instances, the likelihood or severity of the potential risk, or some combination of these. Thus, in one aspect, ranking the intermediate threats may include ranking the intermediate threats based on a combination of a likelihood of maliciousness determined according to the integrative model and an estimated business value of associated files determined according to the valuation model.

As shown in step 1314, the method 1300 may include presenting a list of the one or more intermediate threats in the user interface. As discussed above, the list may be ranked according to a combination of an objective score of riskiness or suspiciousness (e.g., from the integrative model) and an objective score for the business value (e.g., from the valuation model).

As shown in step 1316, the method 1300 may include receiving a user disposition of an intermediate threat, for example using any of the techniques described herein. For example, this may include receiving a user-initiated remedial action for one of the intermediate threats in the user interface. This may also or instead include receiving a user risk assessment for one of the intermediate threats in the user interface, such as by explicitly categorizing the intermediate threat as safe, unsafe, unknown, or appropriate for increased monitoring. In another aspect, the method 1300 may include remediating a risk to a high business value computing object in response to a user input in the user interface.

According to the foregoing, there is disclosed herein a system including a memory storing an integrative model and a valuation model, a threat management facility, and a web server. The integrative model may be configured to evaluate a potential threat by a threat sample based on a combination of a first model configured to identify malicious code based on behavioral tags, a second model configured to identify malicious code based on an executable file path, and a third model configured to identify malicious code based on a Uniform Resource Locator within the threat sample, and the valuation model configured to estimate a business impact of the potential threat based on an estimated business value of one or more files associated with the threat sample. The threat management facility may be configured to apply the integrative model to new threat samples and to identify intermediate threats that are not within a predetermined likelihood of being safe or unsafe. The web server may be configured to display a list of intermediate threats in a user interface, wherein the list of intermediate threats is ranked according to a combination of a first score from the integrative model and a second score from the valuation model. In one aspect, the threat management facility may be configured to remediate a risk to an endpoint in response to a user input received through the user interface.

Figure 14:
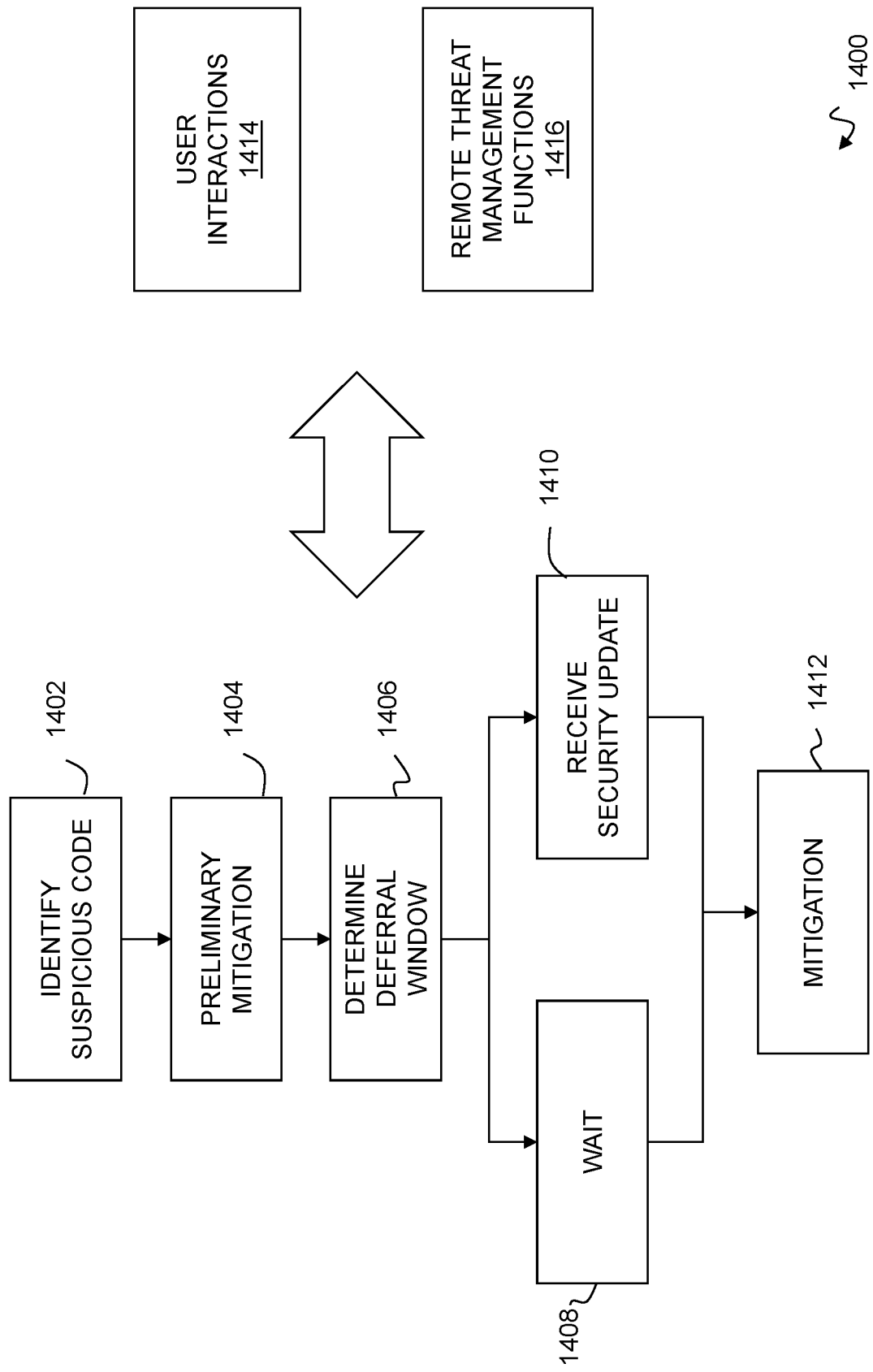
FIG. 14 is a flow chart of a process for malware detection and remediation.

FIG. 14 is a flow chart of a process for malware detection and remediation. In general, a compute instance such as an endpoint may, upon detection of suspicious code, partially or wholly defer remediation in order to provide a threat management infrastructure with adequate opportunity to assess any associated threats and develop suitable mitigations.

As shown in step 1402, the method 1400 may begin with identifying suspicious code. This may, for example, include providing an identification of a code segment such as an unknown code segment on a compute instance as suspicious based on one or more behavioral characteristics of the code segment during execution, or otherwise identifying the code segment as malicious or potentially malicious. In one aspect, behavioral detection or analysis may be used based on, e.g., genotyping or other techniques for characterizing and assessing collections of behaviors to identify similarity to known, malicious behavior(s). For example, the compute instance may be instrumented to detect certain types of events and provide beacons when potentially relevant events are detected, or otherwise monitor computing events or behaviors for potentially malicious activity. In another aspect, a machine learning tool or the like may be used to detect patterns similar or identical to patterns of known, malicious behavior. More generally, any tool or combination of tools for assessing suspiciousness or trustworthiness of code at runtime may be used to identify suspicious code as contemplated herein.

As shown in step 1404, the method 1400 may include deploying preliminary mitigation measures. For example, this may include terminating execution of the code segment upon an identification of the code as suspicious in order to prevent data loss or other security risks or malicious activity. In another aspect, the code segment may be permitted to continue executing. Thus, the preliminary mitigation may also or instead include monitoring execution of the code segment with greater frequency or aggressiveness until a more confident assessment of risk can be obtained, or otherwise adjusting local monitoring of the code segment on the compute instance. Other preliminary mitigations may also or instead be used. For example, the method 1400 may include isolating the compute instance from a data network while waiting a predetermined time period (e.g., as described below), which can facilitate continued local use of the compute instance by a user during the interval of waiting while helping to ensure that any security compromise does not affect other compute instances in an enterprise network.

The method 1400 may also or instead include quarantining the code segment on the compute instance, e.g., so that continued execution of the code segment is locally isolated from files and other executing code on the compute instance. In another aspect, execution of the code segment may be slowed down, or given a lower processing priority, in order to generically reduce opportunities for harm to the compute instance without terminating the code segment altogether. Other constraints on the code segment may also or instead be exposed, such as limited or reduced-speed access to processing resources, files and directories, network connections, memory, and so forth.

In another aspect, the preliminary mitigations may include locally performing a causal analysis on the compute instance to identify a root cause of the identification. The root cause, along with any related information such as an event log for the compute instance over the corresponding interval or an event log for causally related objects and events, may then be reported to a threat management facility for use in subsequent forensic analysis or the like. By proactively gathering this information and reporting it to appropriate resources upon detection of the suspicious code segment, suitable responsive measures can be more quickly developed and deployed.

At the same time, it should be understood that the preliminary mitigation is optional. Thus, in another aspect, no preliminary mitigation is performed. In this case, the code segment may continue to execute, e.g., without intervention or increased monitoring, and the method 1400 may proceed to step 1406.

As shown in step 1406, the method 1400 may include determining a deferral window for awaiting security updates. In general, the deferral window may provide a predetermined time period to wait between the identification and a malware scan. The deferral window may be fixed or variable. For example, the deferral window may be based on a degree of suspiciousness associated with the code segment, or based on other context for the detection such as the type(s) of behavior causing the detection, a security update status of the compute instance, and so forth. Additionally, the deferral window may be determined locally by the compute instance, or remotely, e.g., by a threat management facility or other threat management resource for the enterprise network.

In one aspect, the identification of suspicious code described above further includes a determination of a type of potential threat of the code segment. For example, the type may be a virus, an advanced persistent threat, ransomware, or any of a number of different types of malicious code, either for performing a particular, malicious function such as data exfiltration, network exploration, hijacking computing resources, extorting funds, phishing for passwords or other personal information, and the like, or for more general harmful ends such as rendering a machine unusable. Where a type of potential threat is determined, the deferral window may be selected based on the type of potential threat.

As shown in step 1408, the method 1400 may include, e.g., in response to the identification of suspicious code and determination of a deferral window, waiting to perform a malware scan for an interval based in whole or in part on the deferral window. This may, for example, include waiting at least the predetermined time period of the deferral window, e.g., to afford the threat management infrastructure an opportunity to assess the nature and scope of any associated threats, and to develop suitable countermeasures. The deferral may also or instead be conditional. For example, the interval for waiting may be an amount of time equal to a greater of the predetermined time period and a time to receive a security update from a threat management facility. In this manner, the compute instance can better ensure that any subsequent malware scan includes countermeasures specific to the code segment. In another aspect, the interval for waiting may be a lesser of the deferral window and an amount of time to receive a security update. Thus, for example, when a security update is received, the compute instance may terminate the waiting interval and proceed to any remediation or the like within the security update.

In general, the deferral window may be any amount of time suitable for the analysis of any threats associated with the code segment and the development of any corresponding countermeasures. This may depend in part on whether the analysis is human or automated, and whether the code segment appears to be relatively isolated or widespread (and/or fast-moving). In one practical implementation, a deferral window of one to two days has facilitated the development of suitable detection and remediation measures in most cases.

It will also be appreciated that the interval may be windowed in more nuanced ways. For example, an update received within the first thirty minutes of the deferral window will likely not contain responsive mitigations (absent other circumstances, such as if the threat attracts significant early attention, and is thought to be highly dangerous and virulent). Thus, the interval for waiting may be equal to the deferral window, unless an update is received more than thirty minutes (or some other delay) after the identification of the suspicious code, or unless the update is specifically and explicitly directed to the code segment associated with the identification. For example, if a security update is received by a compute instance very shortly after the identification of suspicious code on the compute instance, such as a few seconds, a few minutes, or less than an hour, after the identification, then the waiting interval may ignore the arrival of this security update, and the method may include waiting to perform a malware scan or take other remedial action until a greater of the deferral window and a next security update, or until a lesser of the deferral window and a next security update. Stated differently, waiting may include ignoring a security update received within a predetermined update window after the identification, and initiating a deferral window rule, such as any of those described above, only after the predetermined update window has passed. This can advantageously provide an improved opportunity to globally address potential malware before disposing of the identified code. More generally, any suitable combination of conditions and rules may be used, consistent with the general goal of permitting the development of responsive countermeasures before initiating a scan of the compute instance and/or code segment.

The compute instance may usefully perform other related tasks while waiting during the deferral window. For example, the compute instance may perform a root cause analysis as described above, or gather other data that might be useful for forensic analysis. In one aspect, the method 1400 may include transmitting information about the identification from the compute instance to a remote threat management resource for analysis while waiting the predetermined time period. This may be useful, for example, so that the remote threat management resource can perform an initial assessment of the potential risk and initiate investigation of remedial measures as appropriate.

As shown in step 1410, the method 1400 may include receiving a security update, e.g., from a threat management facility or other threat management resource for an enterprise network. The security update may include an update to the detection data used by a malware scan, such as signatures or other detection improvements, either for the code segment itself, or for related payloads or the like that can be statically analyzed. The security update may also or instead include an update to remediation tools for the compute instance, and/or any other data, tools or the like necessary or helpful to address a threat associated with the code segment. For example, the security update may include tools for uninstalling programs associated with the code segment, cleaning up files and other malicious payload(s) stored by the code segment or associated malware on the compute instance, reversing malicious changes to registry data and so forth. In general, the security update may include updated information created by an administrator for the enterprise network, or received from a third-party resource such as a research lab or the like, or any combination of the foregoing.

In another aspect, the compute instance may proactively initiate a security update after expiration of the deferral window. Thus, for example, the method 1400 may optionally include, after waiting the predetermined time period of the deferral window and before performing the malware scan, updating a local security agent for performing the malware scan on the compute instance.

As shown in step 1412, the method 1400 may include executing mitigations based on the security update. For example, this may include performing a malware scan, e.g., after waiting the predetermined time period of the deferral window, either alone or in combination with an amount of time required to receive a security update. In general, performing the malware scan may include performing signature-based detections for related processes, programs, files, and other computing objects. This may also or instead include malware remediations, e.g., for finding and removing related code, repairing or reinstalling infected programs, and so forth, rolling back registry updates, cleaning up browsers (e.g., to restore settings, clear caches, etc.), updating certificates, and so forth. Where a root cause analysis is performed as described herein, executing mitigations may include remediating the root cause as appropriate.

In one aspect, where no security update is received that is related to the suspicious code segment, the mitigation may be omitted or skipped. This may be the case where, for example, the code segment is assessed to pose a very low risk, or where the code segment is determined to be associated with safe or trusted software. Similarly, where the code segment (or a related process or the like) is whitelisted, or where the detection is otherwise determined to be a false positive malware detection, no further action is required, and the security update may optionally include a whitelist notification or other indication that the code segment may continue executing safely.

As shown in step 1414, the method 1400 may include any number of user interactions, concurrently with or sequentially with the various steps described above. For example, the method 1400 may include notifying a user of the compute instance of the identification, such as by displaying a window in an interface of the compute instance to notify the user that the identification has occurred, and that possible remedial actions are being developed. The method 1400 may also or instead include querying the user through the user interface about whether to permit or terminate execution of the code segment. In this manner, the user may explicitly control whether the code can continue executing, thus permitting the user to override a potential termination where the user knows or believes that the code is safe. Other useful user interactions may include requesting an update to the user's explicit termination decision when a security update is received. Thus, for example, where a user requests continued execution of the code segment and the security update returns with a strong conviction of malicious content, the user may be advised of the malware conviction and asked whether to continue executing the code segment (or told that the execution is being terminated regardless of the user's explicit decision).

As shown in step 1416, the method 1400 may also or instead include corresponding actions at a remote threat management resource. For example, this may include generating security resolution data at the remote threat management resource. This may include any responsive security resolution data, such as one or more of a remediation for the code segment, a whitelist of the code segment, and an adjustment to security monitoring for an enterprise network to address a threat by the code segment. More generally, any data necessary or helpful for improve detection of a corresponding threat or a remediation of affected endpoints within an enterprise network may usefully be generated by and deployed from a remote threat management resource.

In another aspect, the threat management resource may coordinate iterative security reviews. Thus, for example, where a threat is not found but the behavior is suspicious, the threat management resource may reset the deferral window (optionally with a different duration) to facilitated continued monitoring and ensure that a suitable security update is deployed in the event that a malware conviction occurs. The threat management resource may also or instead review reports from a group of endpoints to determine whether the identified code segment has been detected elsewhere, and if so, to determine whether a consensus is available as to the security posture of the code segment (e.g., that the code is safe, or that the code is malicious).

In another aspect, there is disclosed herein a system for malware detection and remediation. The system may generally include an endpoint and a threat management facility coupled in a communicating relationship with one another through an enterprise network. The endpoint may include a memory and a processor, and the processor may be configured by computer executable code stored in the memory to perform the steps of providing an identification of a code segment on a compute instance as suspicious based on one or more behavioral characteristics of the code segment during execution, determining a deferral window that provides a predetermined time period to wait between the identification and a malware scan, in response to the identification, waiting the predetermined time period of the deferral window, transmitting a notification about the identification to a remote resource, and after waiting at least the predetermined time period, performing the malware scan. The threat management facility may be configured to receive the notification from the endpoint and to generate security resolution data responsive to the identification, the security resolution data including one or more of an update to detection data for the malware scan, a remediation for the code segment, a whitelist of the code segment, and an adjustment to security monitoring for the enterprise network to address a threat by the code segment. In one aspect, the threat management facility may be further configured to select the predetermined time period (for the endpoint to wait between the identification and the malware scan) and transmit the predetermined time period to the endpoint.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. Further, absent an explicit indication to the contrary, the disclosed steps may be modified, supplemented, omitted, and/or re-ordered without departing from the scope of this disclosure. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for malware detection and remediation, the computer program product comprising computer executable code embodied in a non-transitory computer readable medium that, when executing on one or more computing devices, performs the steps of:
providing an identification of a code segment on a compute instance as suspicious;
terminating execution of the code segment;
determining a deferral window that provides a predetermined time period to wait between the identification and a malware scan of the code segment;
determining a security update deferral time period that is less than the predetermined time period of the deferral window, the security update deferral time period defining a minimum time to wait between the identification and receipt of a security update for use in the malware scan of the code segment; and
after waiting an amount of time equal to the security update deferral time period, performing the malware scan upon the earlier of expiration of the predetermined time period and a time at which a security update is received from a threat management facility after the security update deferral time period.

2. The computer program product of claim 1 wherein the identification of the code segment on the compute instance as suspicious is based on a static analysis of the code segment.

3. The computer program product of claim 1 wherein the security update includes at least one of an update to remediation tools for the compute instance and an update to detection data used by a malware scan.

4. A method comprising:
providing an identification of a code segment on a compute instance as suspicious;
determining a security update deferral time period defining a minimum time to wait after the identification of the code segment as suspicious;
after expiration of the security update deferral time period, waiting until the earliest of receipt of a security update for use in a malware scan and a predetermined time period to wait for the security update; and
after waiting for the earliest of the receipt of the security update and the predetermined time period, performing the malware scan.

5. The method of claim 4 further comprising terminating the code segment upon the identification of the code segment as suspicious.

6. The method of claim 4 further comprising isolating the compute instance from a data network while waiting the predetermined time period.

7. The method of claim 4 further comprising quarantining the code segment while waiting the security update deferral time period.

8. The method of claim 4 further comprising adjusting local monitoring of the code segment on the compute instance upon the identification of the code segment as suspicious.

9. The method of claim 4 further comprising performing a causal analysis on the compute instance to identify a root cause of the identification.

10. The method of claim 9 further comprising remediating the root cause.

11. The method of claim 4 further comprising notifying a user of the compute instance of the identification.

12. The method of claim 11 further comprising querying the user through a user interface of the compute instance about whether to permit or terminate execution of the code segment.

13. The method of claim 4 further comprising, after waiting the security update deferral time period and before performing the malware scan, updating a local security agent for performing the malware scan on the compute instance.

14. The method of claim 4 wherein the identification of the code segment as suspicious is based on one or more behavioral characteristics of the code segment during execution.

15. The method of claim 4 wherein the identification of the code segment as suspicious is based on a static analysis of the code segment.

16. The method of claim 4 wherein the identification of the code segment as suspicious is based on a machine learning tool.

17. The method of claim 4 wherein the identification of the code segment as suspicious is based on a signature-based detection.

18. The method of claim 4 wherein at least one of the security update deferral time period and the predetermined time period is dynamically varied based on a context for the identification.

19. A system comprising:
an endpoint in an enterprise network, the endpoint including a memory and a processor, the processor configured by computer executable code stored in the memory to perform the steps of providing an identification of a code segment on a compute instance as suspicious based on one or more behavioral characteristics of the code segment during execution, determining a deferral window that provides a predetermined time period to wait between the identification and a malware scan of the code segment, determining a security update deferral time period that is less than the predetermined time period of the deferral window and that defines a minimum time to wait between the identification and receipt of a security update for use in the malware scan of the code segment, in response to the identification, transmitting a notification about the identification to a remote resource, and after waiting the security update deferral time period, performing the malware scan upon the earlier of expiration of the predetermined time period and a time at which the security update is received after the security update deferral time period; and
a threat management facility for the enterprise network, the threat management facility configured to receive the notification from the endpoint and to generate security resolution data responsive to the identification, the security resolution data including one or more of an update to detection data for the malware scan, a remediation for the code segment, a whitelist of the code segment, and an adjustment to security monitoring for the enterprise network to address a threat by the code segment.

20. The system of claim 19 wherein the threat management facility is further configured to select the predetermined time period for the endpoint to wait between the identification and the malware scan and transmit the predetermined time period to the endpoint.

\* \* \* \* \*